United States Patent [19]

Ohnishi et al.

[11] Patent Number: 4,886,968
[45] Date of Patent: Dec. 12, 1989

[54] RADIATION IMAGE READ-OUT APPARATUS

[75] Inventors: Masahiro Ohnishi; Nobuhiko Ogura; Katsuaki Muraishi, all of Kanagawa, Japan

[73] Assignee: Fuji Photo Film Co., Ltd., Kanagawa, Japan

[21] Appl. No.: 225,443

[22] Filed: Jul. 28, 1988

[30] Foreign Application Priority Data

| Jul. 29, 1987 | [JP] | Japan | 62-189539 |
| Feb. 3, 1988 | [JP] | Japan | 63-23500 |
| Feb. 12, 1988 | [JP] | Japan | 63-30629 |
| Feb. 19, 1988 | [JP] | Japan | 63-37003 |
| Feb. 19, 1988 | [JP] | Japan | 63-37004 |

[51] Int. Cl.$^4$ ............................................. G03G 5/16
[52] U.S. Cl. ........................... 250/327.2; 250/484.1; 358/491; 358/493
[58] Field of Search ............... 358/292, 290, 285; 250/327.2 A–372.2 L

[56] References Cited

U.S. PATENT DOCUMENTS

| Re. 31,847 | 3/1985 | Luckey | 250/327.2 A |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/413.13 |
| 4,387,428 | 6/1983 | Ishida et al. | 364/413.13 |
| 4,651,220 | 3/1987 | Hosoi et al. | 250/327.2 C |
| 4,694,171 | 9/1987 | Hosoi et al. | 250/327.2 C |
| 4,712,009 | 12/1987 | Ohgoda et al. | 250/327.2 C |
| 4,771,337 | 9/1988 | Endo et al. | 358/285 |
| 4,812,916 | 3/1989 | Iwamoto et al. | 358/285 |
| 4,816,923 | 3/1989 | Saotome | 358/285 |
| 4,827,129 | 5/1989 | Tressl et al. | 358/290 |

Primary Examiner—Janice A. Howell
Assistant Examiner—Jacob Eisenberg
Attorney, Agent, or Firm—Sughrue, Mion, Zinn, Macpeak & Seas

[57] ABSTRACT

A radiation image read-out apparatus comprises a sheet holding device for holding an image-recorded stimulable phosphor sheet on a cylindrical surface, and a spinner provided with a deflection mirror for reflecting stimulating rays coming from a semi-transparent mirror to the stimulable phosphor sheet, and a condensing lens for converging the reflected stimulating rays on the stimulable phosphor sheet. The spinner rotates the deflection mirror and the condensing lens to scan the stimulating rays in a main scanning direction on the stimulable phosphor sheet, and the sheet holding device is moved normal to the main scanning direction. A detection lens converges light emitted by the stimulable phosphor sheet upon exposure to the stimulating rays, passing through the condensing lens and coming from the semi-transparent mirror. An aperture plate having an aperture allowing the passage of only the omitted light thus converged is provided at a position of convergence by the detection lens, and a photodetector is provided at the rear of the aperture plate.

9 Claims, 16 Drawing Sheets

RADIATION IMAGE READ-OUT APPARATUS

BACKGROUND OF THE INVENTION

1. Field of the Invention

This invention relates to a radiation image read-out apparatus for reading out a radiation image stored on a stimulable phosphor sheet by scanning the stimulable phosphor sheet with stimulating rays which cause it to emit light in proportion to the stored radiation energy. This invention particularly relates to a radiation image read-out apparatus which accurately reads out a radiation image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

The stimulable phosphor sheet is used as a means for recording mainly a medical image in the aforesaid radiation image recording and reproducing system, and in various other fields. For example, the applicant proposed in Japanese Unexamined Patent Publication Nos. 61(1986)-51738 and 61(1986)-93539 a method of recording and reproducing an electron microscope image by utilizing a stimulable phosphor sheet in an electron microscope. Basically, the proposed method of recording and reproducing an electron microscope image comprises the steps of (i) exposing a stimulable phosphor sheet for storing electron beam energy thereon to an electron beam passing through a sample in a vacuum to have the electron beam energy stored on the stimulable phosphor sheet, (ii) thereafter exposing the stimulable phosphor sheet to, for example, stimulating rays to release the stored energy as light emission, (iii) photoelectrically detecting the emitted light to obtain image signals, and (iv) reproducing an electron beam image of the sample by use of the image signals.

It is desired that the read-out apparatus for irradiating the stimulating rays to the stimulable phosphor sheet and detecting the light emitted by the stimulable phosphor sheet in the aforesaid electron microscope image recording and reproducing method be capable of scanning the stimulating rays at a higher density and detecting the recorded image more accurately than in the read-out apparatus for the aforesaid radiation image recording and reproducing system. However, with the conventional read-out apparatus, it is not always possible to achieve the image read-out at such a higher density and higher accuracy. Specifically, in the radiation image recording and reproducing system, a light beam deflected by a light deflector in the main scanning direction is generally made to impinge upon and converged by a scanning lens such as an f$\theta$ lens, and is scanned in the main scanning direction on the stimulable phosphor sheet conveyed at a predetermined speed in the sub-scanning direction. In order to minimize the side of the f$\theta$ lens, an f$\theta$ lens having a comparatively long focal length must be used and spaced from the stimulable phosphor sheet. In the case where the f$\theta$ lens having a comparatively long focal length is used, it is not always possible to converge the stimulating rays to a desired beam diameter on the stimulable phosphor sheet. Also, detection of the light emitted by the stimulable phosphor sheet by use of a photodetector in the aforesaid read-out apparatus is carried out via a transparent light guide member having a light input face positioned along the main scanning line and having a rear end shaped to match the photodetector. In this case, the light guiding efficiency of the light guide member readily differs among positions of light emission in the main scanning direction on the stimulable phosphor sheet (this problem is hereinafter referred to as shading), and therefore density nonuniformity arises in the reproduced visible image.

On the other hand, a novel read-out apparatus is disclosed in Japanese Unexamined Patent Publication No. 59(1984)-13235 wherein an optical element such as a dichroic mirror for reflecting or transmitting stimulating rays and transmitting or reflecting light emitted by a stimulable phosphor sheet is provided between a light source and the stimulable phosphor sheet, a condensing element (lens) for converging the stimulating rays coming from the optical element on the stimulable phosphor sheet is provided, and the stimulable phosphor sheet is formed cylindrically and rotated for carrying out scanning in the main scanning direction. In this case, the light emitted by the stimulable phosphor sheet passes through the condensing lens from the direction reverse to the stimulating rays, and is collimated thereby. The collimated light passes through or is reflected by the dichroic mirror, is converged by a converging lens, and is then detected by a photodetector. With the disclosed apparatus, an optical element having a short focal length can be used as the aforesaid condensing element, and the stimulating rays can be converged to a small spot diameter. Also, the light emitted by the stimulable phosphor sheet is condensed by the condensing lens and the converging lens, and therefore no shading arises as in the case where a large light guide member is used.

However, in the radiation image read-out apparatus, the stimulating rays impinging upon the stimulable phosphor sheet are often reflected partially by the stimulable phosphor sheet, and the reflected stimulating rays are again reflected by various components of the read-out apparatus onto portions of the stimulable phosphor sheet, thereby causing the sheet portions to emit light (this phenomenon is hereinafter referred to as the flare phenomenon). When the flare phenomenon arises, the sheet portions outside of the predetermined scanning position of the stimulating rays are caused by the reflected stimulating rays to emit light, and such light is detected by the photodetector together with the light emitted by the predetermined scanning position. Therefore, the reproduced visible image thus obtained becomes incorrect, and contrast of the image deteriorates. It is considered that the reflected stimulating rays impinges upon, for example, the condensing element and is reflected thereby, and the flare phenomenon thus occurs also in the aforesaid read-out apparatus.

Moreover, the aforesaid radiation image read-out apparatus has the drawback that the stimulating rays impinging upon the stimulable phosphor sheet are scattered inside of the sheet, and the scattered stimulating rays cause light emission, thereby to blur the image.

SUMMARY OF THE INVENTION

The primary object of the present invention is to provide a radiation image read-out apparatus which enables high-density image read-out, and which reads out an image accurately by preventing the shading, the flare phenomenon and blurring of the image.

Another object of the present invention is to provide a radiation image read-out apparatus which is provided with a sheet conveyance system for conveying a stimulable phosphor sheet from a feed magazine to a platen for holding the stimulable phosphor sheet thereon during image read-out and a sheet conveyance system for conveying the stimulable phosphor sheet after the image read-out from the platen to a housing magazine such that the apparatus size is minimized.

A further object of the present invention is to provide a radiation image read-out apparatus which eliminates the problem that a stimulable phosphor sheet curled after image read-out is entangled in a sheet conveyance system or cannot be housed smoothly in a magazine.

A still further object of the present invention is to provide an electron microscope image read-out apparatus which automatically optimizes both sharpness and read-out sensitivity for every electron microscope image.

The present invention provides a first radiation image read-out apparatus for reading out a radiation image stored on a stimulable phosphor sheet by scanning the stimulable phosphor sheet carrying the radiation image stored thereon with stimulating rays which cause the stimulable phosphor sheet to emit light in proportion to the stored radiation energy, and photoelectrically detecting the emitted light, wherein the improvement comprises the provision of:
  (i) a sheet holding means for holding said stimulable phosphor sheet thereon in a cylindrical surface form,
  (ii) a stimulating ray source for producing said stimulating rays,
  (iii) a semi-transparent mirror provided in an optical path of said stimulating rays for transmitting and/or reflecting the incident stimulating rays,
  (iv) a spinner provided with a deflection mirror for reflecting said stimulating rays coming from said semi-transparent mirror toward said stimulable phosphor sheet on the center axis of said cylindrical surface, and a condensing lens provided in the optical path of said stimulating rays reflected by said deflection mirror for converging said stimulating rays on said stimulable phosphor sheet, said spinner rotating said deflection mirror and said condensing lens together coaxially with respect to said center axis, thereby to scan said stimulating rays in a main scanning direction on said stimulable phosphor sheet,
  (v) a sub-scanning means for moving said sheet holding means with respect to said spinner in parallel with said center axis,
  (vi) a detection lens provided in an optical path of said light emitted by said stimulable phosphor sheet, passing through said condensing lens and coming from said semi-transparent mirror, said detection lens converging said emitted light,
  (vii) an aperture plate provided at a position of convergence of said emitted light by said detection lens and having an aperture of a size allowing the passage of only said emitted light thus converged therethrough, and
  (viii) a photodetector provided at the rear of said aperture plate.

Each of the condensing lens and the detection lens is not limited to a single lens, and may be composed of a plurality of lenses combined to achieve the lens effect.

The present invention also provides a second radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet o the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet, wherein the improvement comprises the provision of:
  (i) a feed magazine housing stimulable phosphor sheets prior to the image read-out therein, and provided so that a sheet outlet of said feed magazine faces said platen at a first stop position where said movement is started,
  (ii) a first sheet conveyance system for conveying the stimulable phosphor sheet from said feed magazine to said platen, said first sheet conveyance system being provided to convey the stimulable phosphor sheet approximately normal to a direction of said movement of said platen,
  (iii) a housing magazine for housing stimulable phosphor sheets for which the image read-out has been finished, said housing magazine being provided so that a sheet inlet thereof faces said platen at a second stop position where said movement is finished, and
  (iv) a second sheet conveyance system for conveying the stimulable phosphor sheet from said platen to said housing magazine, said second sheet conveyance system being provided to convey the stimulable phosphor sheet approximately parallel with the direction of sheet conveyance of said first sheet conveyance system.

With the configuration of the second radiation image read-out apparatus in accordance with the present invention, the movement range of the platen, the first sheet conveyance system, and the second sheet conveyance system are accommodated in a small space in a nearly U-shaped form.

The present invention further provides a third radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet on the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet, wherein the improvement comprises the provision of:
  (i) a sheet conveyance system provided so that one end portion and the other end portion thereof are respectively close to said platen at a first stop position where said movement is started and said platen at a second stop position where said movement is finished, said sheet conveyance system conveying the stimulable phosphor sheet approximately parallel with a direction of said movement of said platen from said one end portion to said other end portion,
  (ii) a feed magazine housing stimulable phosphor sheets prior to the image read-out therein, and provided close to said one end portion of said sheet conveyance system,
  (iii) a housing magazine for housing stimulable phosphor sheets for which the image read-out has been finished, said housing magazine being provided close to said other end portion of said sheet conveyance system,
  (iv) a first sheet transfer means for transferring the stimulable phosphor sheet from said feed magazine to said sheet conveyance system,
  (v) a second sheet transfer means for transferring the stimulable phosphor sheet from said sheet conveyance system to said platen at said first stop position,
  (vi) a third sheet transfer means for transferring the stimulable phosphor sheet from said platen at said second stop position to said sheet conveyance system, and
  (vii) a fourth sheet transfer means for transferring the stimulable phosphor sheet from said sheet conveyance system to said housing magazine.

The present invention still further provides a fourth radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet on the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet, wherein the improvement comprises the provision of:
  (i) a sheet conveyance system provided so that one end portion and the other end portion thereof are respectively close to said platen at a first stop position where said movement is started and said platen at a second stop position where said movement is finished, said sheet conveyance system conveying the stimulable phosphor sheet approximately parallel with a direction of said movement of said platen between said one end portion and said other end portion,
  (ii) said magazine housing said stimulable phosphor sheets and provided close to said sheet conveyance system,
  (iii) a first sheet transfer means for transferring the stimulable phosphor sheet between said magazine and said sheet conveyance system,
  (iv) a second sheet transfer means for transferring the stimulable phosphor sheet from said sheet conveyance system to said platen at said first stop position,
  (v) a third sheet transfer means for transferring the stimulable phosphor sheet from said platen at said second stop position to said sheet conveyance system, and
  (vi) a magazine movement means for moving said magazine along a row of the stimulable phosphor sheets until a sheet outlet/inlet part of said magazine is located a predetermined position.

The present invention also provides a fifth radiation image read-out apparatus for reading out a radiation image stored on a stimulable phosphor sheet by scanning the stimulable phosphor sheet carrying the radiation image stored thereon with stimulating rays which cause the stimulable phosphor sheet to emit light in proportion to the stored radiation energy, and photoelectrically detecting the light emitted by the stimulable phosphor sheet when it is exposed to the stimulating rays, wherein the improvement comprises the provision of:
  (i) a platen for holding said stimulable phosphor sheet thereon in a cylindrical surface form,
  (ii) a means for scanning said stimulating rays in a main scanning direction on said stimulable phosphor sheet by rotating a stimulating ray irradiation system around a center axis of said cylindrical surface,
  (iii) a means for scanning said stimulating rays in a sub-scanning direction by moving said platen with respect to said stimulating ray irradiation system in parallel with said center axis, and
  (iv) a sheet conveyance system for conveying the stimulable phosphor sheet fed to said platen or the stimulable phosphor sheet taken out of said platen by bending the stimulable phosphor sheet reversely to a direction of bending on said platen.

The present invention further provides an electron microscope image read-out apparatus for exposing a two-dimensional sensor, which carries an electron microscope image of a sample stored thereon by exposure to an electron beam passing through the sample in an electron microscope, to light or heating the two-dimensional sensor to release the stored electron beam energy as light emission, converging the emitted light by a lens, and photoelectrically detecting the emitted light by a photodetector through a small aperture of an aperture plate provided at a position of the convergence, thereby to obtain image signals representing the electron microscope image, wherein the improvement comprises the provision of:
  (i) said aperture plate constituted so that the size of said aperture is variable,
  (ii) an aperture changing means for changing the size of said aperture, and
  (iii) a control means for receiving information on a magnification and/or an electron microscope image recording sensitivity from said electron microscope, and controlling said aperture changing means on the basis of said information so that the size of said aperture is increased as said magnification is higher and/or as said sensitivity is lower.

In order to make the size of the aperture variable, a single aperture plate may be constituted in the same manner as a stop in a camera. Alternatively, a plurality of aperture plates having different aperture sizes may be prepared, and one of the aperture plates may be selectively inserted to the optical path of the emitted light.

The effects of changing the sharpness of the read-out image and the read-out sensitivity can be obtained also by inserting an aperture plate having an aperture of a predetermined size into the optical path or retracting the aperture plate from the optical path. In this case, the aperture size is increased infinitely when the aperture plate is retracted from the optical path. Therefore, the term "changing a size of an aperture" as used herein also embraces such a technique.

The aforesaid two-dimensional sensor is formed of a material capable of temporarily store at least a part of electron beam energy thereon upon exposure to an electron beam, and then releasing at least a part of the stored energy in a detectable form such as light, electricity or sound upon excitation from the exterior. As the two-dimensional sensor, a stimulable phosphor sheet as disclosed in, for example, U.S. Pat. Nos. 4,258,264, 4,276,473, 4,315,318 and 4,387,428, and Japanese Unexamined Patent Publication No. 56(1981)-11395 is particularly suitable. The stimulable phosphor sheet is a sheet-shaped recording material comprising the aforesaid stimulable phosphor. In general, the stimulable phosphor sheet is composed of a supporting material and a stimulable phosphor layer overlaid on the supporting material. The stimulable phosphor layer comprises an appropriate binder and the stimulable phosphor dispersed therein. In the case where the stimulable phosphor layer is self-supporting, the stimulable phosphor layer can by itself form the stimulable phosphor sheet. Examples of the stimulable phosphor for constituting the stimulable phosphor sheet are described in detail in Japanese Unexamined Patent Publication No. 61(1986)-93539.

As the two-dimensional sensor, it is also possible to use a thermal phosphor sheet as disclosed in, for example, Japanese Patent Publication Nos. 55(1980)-47719 and 55(1980)-47720. The thermal phosphor sheet is a sheet shaped recording material comprising a phosphor (thermal phosphor) which releases the stored radiation energy as thermal fluorescence mainly by the heat effect.

With the first radiation image read-out apparatus in accordance with the present invention wherein main scanning of stimulating rays is carried out by the rotation of the spinner, the condensing lens may be small even though it is provided close to the stimulable phosphor sheet. Therefore, a lens having a short focal length may be used as the condensing lens, the stimulating rays can be converged to a small spot on the stimulable phosphor sheet, and image read-out can be carried out at a high density. Also, as the light emitted by the stimulable phosphor sheet is condensed by the two lenses, i.e. the condensing lens and the detection lens, and made to impinge upon the photodetector, no shading arises as in the case where a large light guide member is used. Moreover, with the first radiation image read-out apparatus in accordance with the present invention, the light emitted by sheet portions outside of the predetermined scanning position by the flare phenomenon is guided by the two lenses to positions different from the light emitted by the predetermined position on the stimulable phosphor sheet. As the aperture plate is provided prior to the photodetector, the light emitted by the flare phenomenon is prevented by the aperture plate from impinging upon the photodetector. Therefore, with the first radiation image read-out apparatus in accordance with the present invention, only the light emitted by the predetermined scanning position can be detected accurately, and image read-out can be carried out accurately.

As mentioned above, with the first radiation image read-out apparatus in accordance with the present invention, the image read-out can be carried out at a high density and accurately without density nonuniformity and deterioration of sharpness arising in the image. Accordingly, the first radiation image read-out apparatus in accordance with the present invention is suitable also as an apparatus for reading out an electron microscope image.

With the second radiation image read-out apparatus in accordance with the present invention wherein the sheet feed magazine, the first sheet conveyance system, the platen as the sheet holding means, the second sheet conveyance system, and the sheet housing magazine are provided in the nearly U-shaped form, these components can be accommodated in a small space. Therefore, the apparatus can be made smaller than the conventional apparatus.

With the third and fourth radiation image read-out apparatuses in accordance with the present invention, the sheet conveyance system is provided parallel with and close to the range of movement of the platen at the image read-out section, and the feed magazine and the housing magazine or the single magazine is provided close to the sheet conveyance system. Therefore, these components can be accommodated in a small space, and the apparatus can be made smaller than the conventional apparatus.

Also, with the third radiation image read-out apparatus in accordance with the present invention, in the case where the stimulable phosphor sheet taken out of the feed magazine need not be subjected to the image read-out, the stimulable phosphor sheet can be conveyed directly to the other end portion of the sheet conveyance system without being fed to the platen for the image read-out. With the fourth radiation image read-out apparatus in accordance with the present invention, the stimulable phosphor sheet which need not be subjected to the image read-out can be processed in this manner, or can be maintained in the magazine by the control of the movement of the magazine by use of the magazine movement means without being subjected to the image read-out. Accordingly, unnecessary read-out operation can be avoided, and the read-out processing speed can be increased.

Furthermore, with the fourth radiation image read-out apparatus in accordance with the present invention, sheet feed from the magazine to the platen and sheet housing from the platen to the magazine can be repeated alternately. Therefore, it is only necessary that a single magazine be provided, and the apparatus can be made very small.

With the fifth radiation image read-out apparatus in accordance with the present invention, before or after the stimulable phosphor sheet is held on the platen in the cylindrical surface form, the sheet is passed through the sheet conveyance system for bending the sheet reversely to the direction of bending on the platen, so that the sheet after being processed for the image read-out do not curl. Therefore, with this apparatus, it is possible to eliminate the problem that the stimulable phosphor sheet curled after being processed for the image read-out is entangled in the sheet conveyance system and a housing magazine or cannot be conveyed correctly, and to increase the reliability of read-out processing.

In general, in the case where an electron microscope image has been recorded at a high magnification, the image originally has a high resolution, and it is not desired that the image sharpness be increased in the image read-out. Therefore, in this case, an electron microscope image of good graininess can be reproduced by increasing the size of the aperture of the aperture plate to achieve a high sensitivity instead of increasing the sharpness.

On the other hand, in the case where an electron microscope image has been recorded at a high recording sensitivity by, for example, increasing the electron beam exposure amount or using a two-dimensional sensor having a high sensitivity, it is not necessary to increase the read-out sensitivity. Therefore, in this case, an electron microscope image having a high sharpness and suitable for viewing purposes can be reproduced by decreasing the size of the aperture of the aperture plate to achieve a high sharpness instead of increasing the sensitivity.

With the electron microscope image read-out apparatus in accordance with the present invention wherein the size of the aperture of the aperture plate through which the light emitted by the two-dimensional sensor is to be passed is increased as the magnification of the electron microscope is higher and/or as the recording sensitivity is lower, the electron microscope image which is to be read out at a high sensitivity or the electron microscope image which is to be read out at a high sharpness can be read out with the characteristics as desired. Therefore, with the electron microscope image read-out apparatus in accordance with the present invention, the electron microscope image of a high quality suitable for viewing of the sample can be reproduced even though the magnification of the electron microscope and the recording sensitivity are adjusted to various levels.

DESCRIPTION OF THE PREFERRED EMBODIMENTS

The present invention will hereinbelow be described in further detail with reference to the accompanying drawings.

Figure 1:
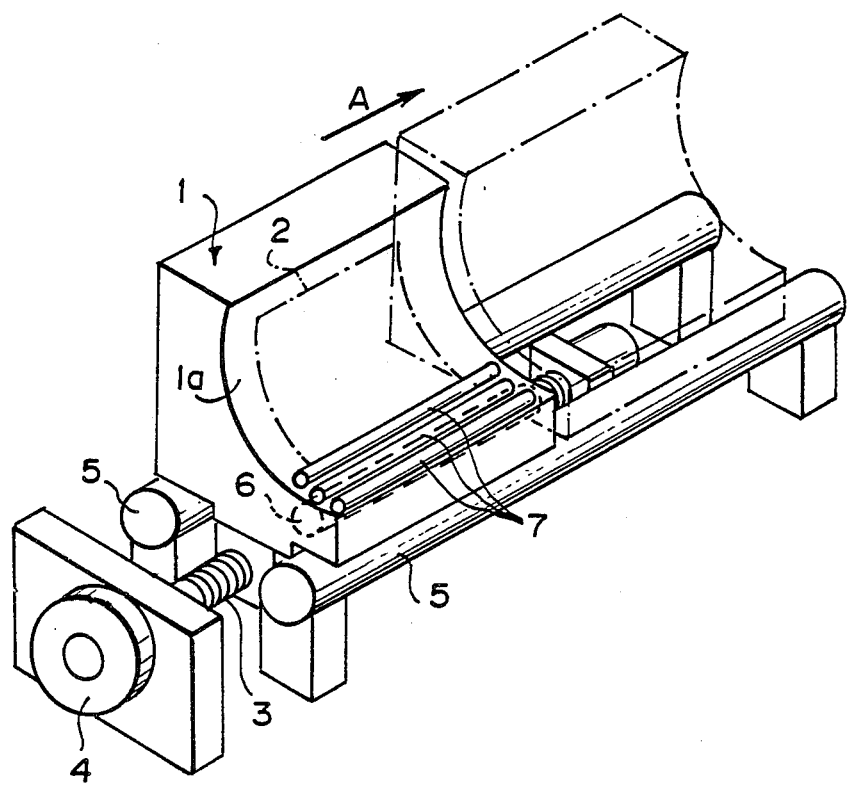
FIG. 1 is a perspective view showing the sheet holding means and the sub-scanning means in an embodiment of the first radiation image read-out apparatus in accordance with the present invention.

With reference to FIG. 1, a stimulable phosphor sheet 2 carrying a radiation image stored thereon is held as indicated by the chain line on an inwardly convex cylindrical surface 1a of a sheet holding means 1. The lower end portion of the sheet holding means 1 is engaged with a screw rod 3 which is rotated by a motor 4 to move the sheet holding means 1 at a predetermined speed in the direction as indicated by the arrow A along two guide rails 5, 5 between the position indicated by the solid line and the position indicated by the chain line. In this embodiment, the sub-scanning means is constituted by the screw rod 3, the motor 4 and the guide rails 5, 5. Also, a lower roller 6 and upper rollers 7, 7, 7 are provided at the lower end portion of the sheet holding means 1. The stimulable phosphor sheet 2 is conveyed by the lower roller 6 and the upper rollers 7, 7, 7 to the cylindrical surface 1a at the position indicated by the solid line, and is conveyed out of the cylindrical surface 1a at the position indicated by the chain line.

Figure 2:
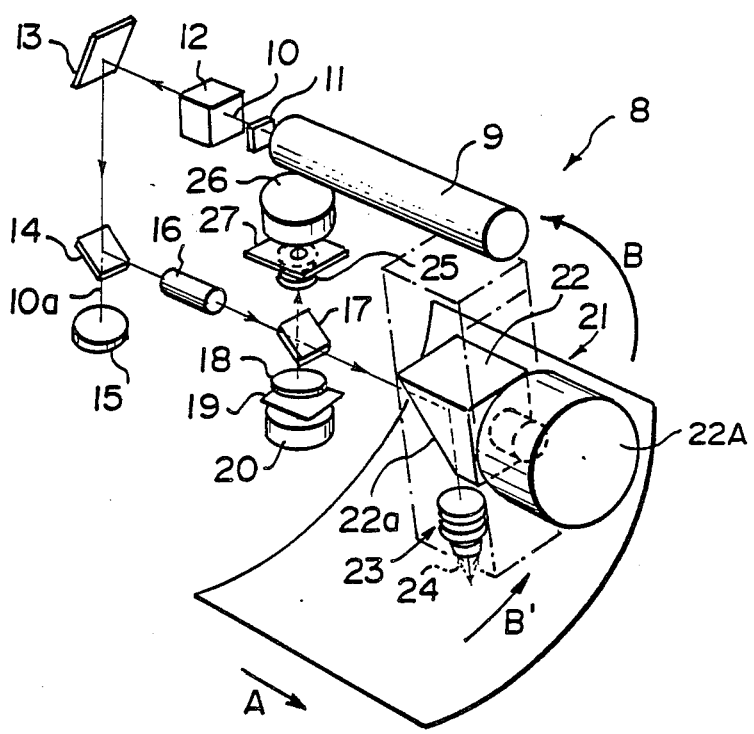
FIG. 2 is a schematic perspective view showing the scanning optical system in the embodiment shown in FIG. 1.

A scanning optical system 8 as shown in FIG. 2 is provided above the sheet holding means 1, and an image stored on the stimulable phosphor sheet 2 is read out by the scanning optical system 8. The image read-out in this embodiment will hereinbelow be described with reference to FIGS. 2 and 3.

In the scanning optical system 8, a laser beam 10 is produced as stimulating rays by a He-Ne laser 9 as a stimulating ray source. The laser beam 10 is passed through a filter 11 for cutting off light of unnecessary wavelength, passed through an acousto-optic modulator (AOM) 12 for adjusting the intensity of the laser beam 10, and then reflected by mirrors 13 and 14 to change the optical path. The mirror 14 transmits a very small portion of the incident laser beam 10 in a predetermined ratio as indicated by 10a. The intensity of the laser beam 10a passing through the mirror 14 is detected by a photodetector 15 as a power monitor for the laser beam 10. The photodetector 15 controls the AOM 12 in accordance with the detected intensity of the laser beam 10a so that the intensity of the laser beam 10 radiated by the AOM 12 is maintained constant.

The laser beam 10 reflected by the mirror 14 is passed through a beam expander 16 for expanding the beam diameter of the laser beam 10 to a predetermined value, and then impinges upon a dichroic mirror 17 for transmitting light having a wavelength within the wavelength range of the laser beam 10 and reflecting light having a wavelength within the wavelength range of light emitted by the stimulable phosphor sheet 2 when the stimulable phosphor sheet 2 is stimulated by the laser beam 10. The dichroic mirror 17 has a laser beam input face 17a surface-treated so that it reflects a very small portion of the incident laser beam 10 as indicated by 10b. The laser beam 10b reflected by the laser beam input face 17a is converged by a converging lens 18, passes through an aperture 19a of an aperture plate 19, and is detected by a photodetector 20. The photodetector 20 detects the position of incidence of the laser beam 10b, thereby to discriminate whether the optical axis of the laser beam 10 is at a predetermined position, and generates a signal for fine adjustment of the positions of the mirrors 13 and 14.

The laser beam 10 passing through the dichroic mirror 17 impinges upon a spinner 21 provided in the optical path of the laser beam 10, and is reflected and deflected thereby. The spinner 21 continuously and quickly rotates a deflection mirror 22 by a spindle motor 22A in the direction as indicated by the arrow B. The deflection mirror 22 is provided with a reflection surface 22a inclined at an angle of 45° with respect to the incident laser beam 10. The deflection mirror 22 is provided to reflect the laser beam 10 on the center axis of the cylindrical surface 1a of the sheet holding means 1, and the length of the optical path of the laser beam 10 from the position of the reflection to the stimulable phosphor sheet 2 is always maintained constant. A condensing lens 23 for converging the laser beam 10 incident as a collimated light to a spot having a desired diameter on the stimulable phosphor sheet 2 is provided in the optical path of the laser beam 10 reflected and deflected by the deflection mirror 22. The condensing lens 23 is constituted by, for example, a combination of three lenses, and the distance between the condensing lens 23 and a scanning position on the stimulable phosphor sheet 2 is equal to the focal length f of the overall condensing lens 23. The lens system 27 is rotated as a part of the spinner 21 together with the deflection mirror 22. The laser beam 10 is reflected and deflected by the spinner 21 to scan the stimulable phosphor sheet 2 repeatedly in the main scanning direction as indicated by the arrow B' in FIG. 2. At the same time, as mentioned above, the sheet holding means 1 is moved at the predetermined speed in the sub-scanning direction as indicated by the arrow A. Therefore, the stimulable phosphor sheet 2 is two-dimensionally scanned by the laser beam 10. In the case where the aforesaid condensing lens 23 is used, the condensing lens 23 can be provided close to the stimulable phosphor sheet 2 without the diameter thereof being increased. Therefore, a lens having a short focal length can be used as the condensing lens 23, thereby to converge the laser beam 10 to a very small spot diameter and to carry out the image read-out from the stimulable phosphor sheet 2 at a high density.

As the stimulable phosphor sheet 2 is exposed to the laser beam 10, the exposed portion of the stimulable phosphor sheet 2 emits light 24 in an amount proportional to the radiation energy stored on said portion. The light 24 is emitted as non-directional light by said exposed portion of the stimulable phosphor sheet 2, and is collimated by the condensing lens 23 spaced by a distance equal to the focal length f from said exposed portion of the stimulable phosphor sheet 2. Then, the emitted and collimated light 24 is reflected by the deflection mirror 22 of the spinner 21 and by the dichroic mirror 17. A detection lens 25 composed of, for example, three lenses for converging the emitted light 24 is provided in the optical path of the emitted light 24 reflected by the dichroic mirror 17. The emitted light 24 is converged the by detection lens 25, and impinges upon a photomultiplier 26 provided as a photodetector. An aperture plate 27 having an aperture 27a of such a size that only the emitted and converged light 24 can pass therethrough is provided at the position of the convergence of the emitted light 24 by the detection lens 25. Specifically, in the case where a part of the laser beam 10 impinging upon the stimulable phosphor sheet 2 is reflected by the sheet surface, and the reflected laser beam impinges upon members of the apparatus such as the condensing lens 23 and is again reflected by the members to portions of the stimulable phosphor sheet 2 outside of the predetermined position of laser beam irradiation, thereby to stimulate said sheet portions, light is emitted by said sheet portions. However, the light thus emitted by said sheet portions passes through the condensing lens 23 and the detection lens 25, and is guided to positions different from the position to which the light 24 emitted by the predetermined position on the stimulable phosphor sheet 2 is guided. Therefore, the light thus emitted by said sheet portions is intercepted by the aperture plate 27, and is prevented from impinging upon the photomultiplier 26. In this manner, with the embodiment wherein the aperture plate 27 is provided, the light emitted by the stimulable phosphor sheet 2 when it is exposed to reflected stimulating rays and stimulating rays scattered in the stimulable phosphor sheet 2 can be cut off, and the image read-out can be carried out accurately. It is considered that the laser beam 10 reflected by the stimulable phosphor sheet 2 and passing through the condensing lens 23 will often pass through the aperture 27a of the aperture plate 27 together with the light 24 emitted by the stimulable phosphor sheet 2. To eliminate this problem, a cut filter 28 for selectively transmitting only light having a wavelength within the wavelength range of the emitted light 24 is provided on the light receiving face of the photomultiplier 26, thereby to cut off the laser beam passing through the aperture 27a. The photomultiplier 26 photoelectrically detects the emitted light 24 and generates electric read-out signals. The read-out signals are processed by an image processing circuit (not shown), fed to an image reproducing apparatus such as a CRT or a scanning recording apparatus, and used for reproducing the radiation image as a visible image on the CRT or as a hard copy.

As mentioned above, with the aforesaid embodiment wherein the focal length of the condensing lens 23 is shortened, the image read-out can be carried out at a high density. Also, no shading arises since light condensing is effected by the condensing lens 23 and the detection lens 25. Furthermore, since the aperture plate 27 is provided, noise-free image read-out can be carried out accurately.

In the aforesaid embodiment, the dichroic mirror 17 is used as the optical element for guiding the laser beam 10 as stimulating rays toward the stimulable phosphor sheet 2 and guiding the light 24 emitted by the stimulable phosphor sheet 2 toward the photomultiplier 26 as the photodetector. However, in the case where the optical amount of the stimulating rays and the optical amount of the emitted light 24 include a margin, an ordinary semi-transparent mirror may be utilized instead of the dichroic mirror 17. Also, the sub-scanning may be carried out by moving the overall scanning optical system 8 instead of moving the sheet holding means 1. Moreover, the configuration and layout of each optical element of the scanning optical system 8 are not limited to those in the aforesaid embodiment.

Figure 4:
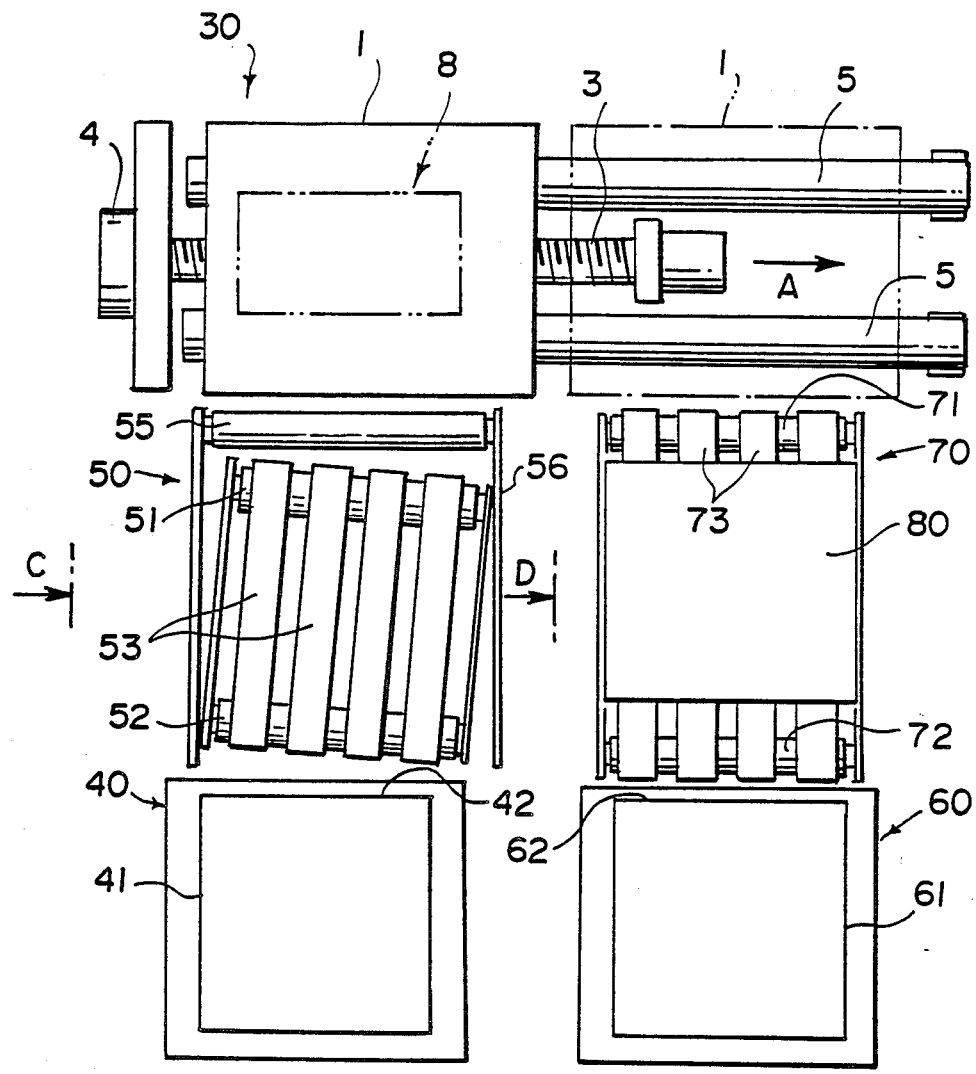
FIG. 4 is a plan view showing an embodiment of the second radiation image read-out apparatus in accordance with the present invention.
Figure 5:
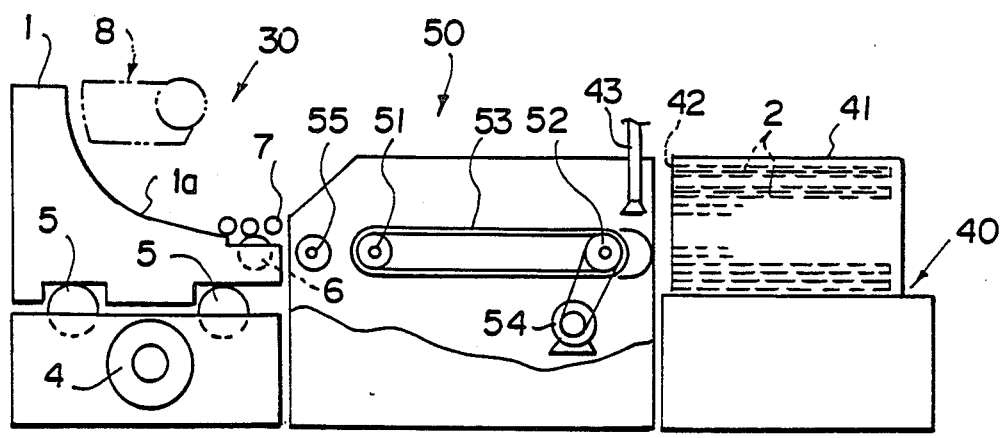
FIGS. 5 and 6 are side views showing a part of the embodiment shown in FIG. 4.
Figure 6:
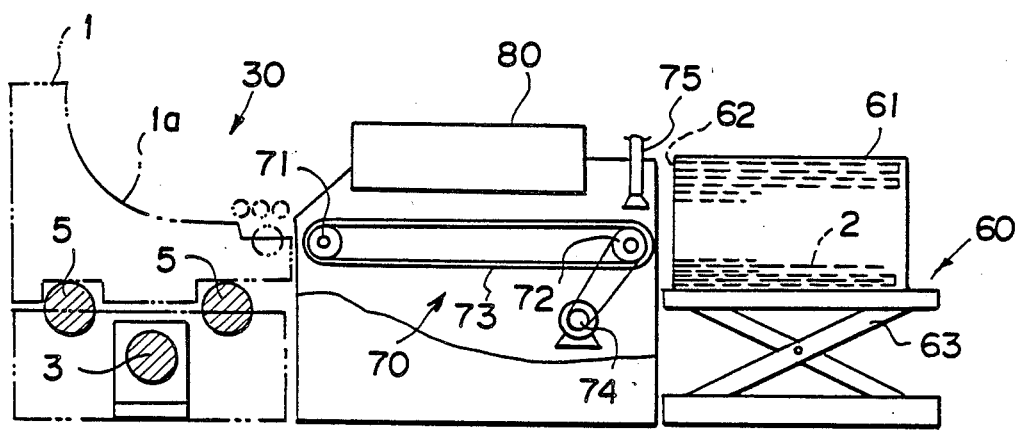

An embodiment of the second radiation image read-out apparatus in accordance with the present invention will hereinbelow be described with reference to FIGS. 4, 5 and 6. In FIGS. 4, 5 and 6, similar elements are numbered with the same reference numerals with respect to FIGS. 1, 2 and 3.

FIG. 4 showing the overall configuration of this embodiment, and FIGS. 5 and 6 are side views taken from the directions as indicated by the arrows C and D of FIG. 4. Basically, this embodiment comprises a read-out section 30, a feed magazine holding section 40, a first sheet conveyance system 50 provided between the feed magazine holding section 40 and the read-out section 30, a housing magazine holding section 60, a second sheet conveyance system 70 provided between the housing magazine holding section 60 and the read-out section 30, and an erasing section 80 provided above the second sheet conveyance system 70.

At the read-out section 30, a platen 1 as a sheet holding means is moved linearly in the direction as indicated by the arrow A between a first stop position indicated by the solid line in FIG. 4 and a second stop position indicated by the chain line. While the stimulable phosphor sheet 2 held on the platen 1 as will be described later is thus moved, the image read-out from the sheet 2 is carried out.

A plurality of stimulable phosphor sheets 2, 2, ... carrying a radiation image stored thereon by being exposed to radiation passing through an object such as the human body or to an electron beam passing through a sample in an electron microscope are housed in a feed magazine 41, and fed in this form to the radiation image read-out apparatus. Specifically, the feed magazine 41 is held at the feed magazine holding section 40 with a sheet outlet 42 of the feed magazine 41 facing the platen 1 at its first stop position. The stimulable phosphor sheets 2, 2, ... are taken out of the feed magazine 41 one by one by a sheet take-out means 43 which may be composed of a moveable arm provided with an air suction cup at a lower edge. The stimulable phosphor sheet 2 thus taken out is placed on the first sheet conveyance system 50.

By way of example, the first sheet conveyance system 50 is constituted by a plurality of endless belts 53, 53, ... applied around a pair of rollers 51 and 52, a motor 54 for rotating the roller 52 to rotate the endless belts 53, 53, ..., a guide roller 55, and sheet position regulating plates 56, 56. When a part of a single stimulable phosphor sheet 2 has been placed on the endless belts 53, 53, ..., the motor 54 is operated by an instruction received from a control circuit (not shown), and the endless belts 53, 53, ... are thus rotated to convey the sheet 2 toward the read-out section 30. In this embodiment, the sheet position regulating plates 56, 56 are secured normal to the direction of movement of the platen 1 as indicated by the arrow A, and the endless belts 53, 53, ... are provided slightly obliquely with respect to the sheet position regulating plates 56, 56. Therefore, the stimulable phosphor sheet 2 contacts the sheet position regulating plates 56, 56 during the conveyance, and is conveyed therealong. As the position of the stimulable phosphor sheet 2 is regulated in this manner, the sheet 2 is fed to the platen 1 by maintaining the predetermined sheet position in the horizontal direction.

Figure 3:
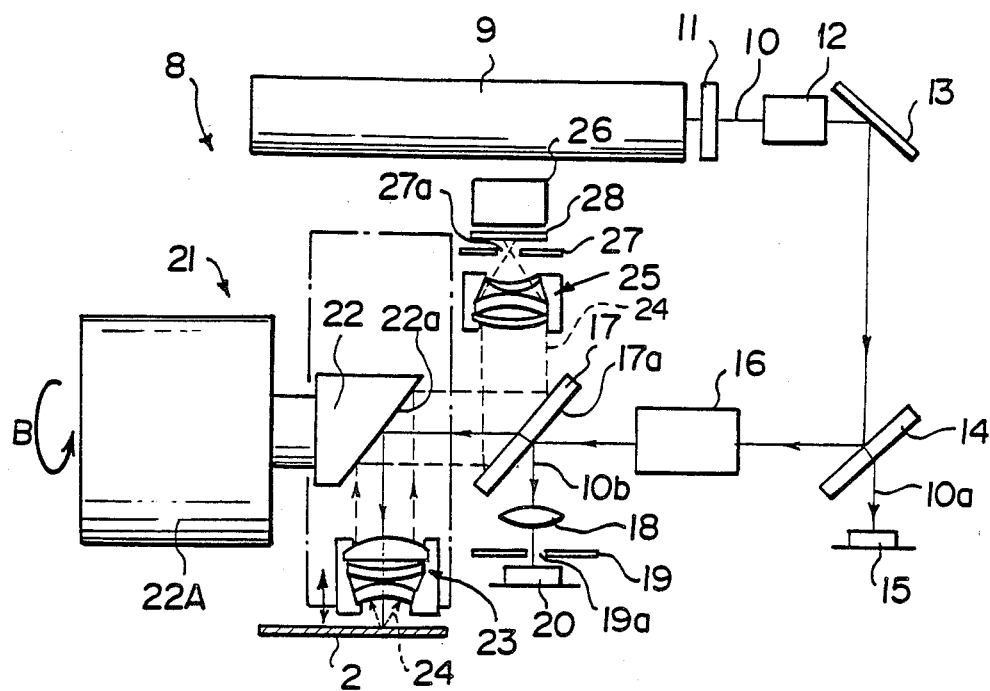
FIG. 3 is a front view showing the scanning optical system shown in FIG. 2.

The read-out section 30 is constituted in the same manner as illustrated in FIGS. 1, 2 and 3. The platen 1 has the inwardly convex cylindrical surface 1a, and the drive roller (lower roller) 6 and the driven rollers (upper rollers) 7, 7, 7 are provided close to the lower edge portion of the cylindrical surface 1a. At the time the leading edge of the stimulable phosphor sheet 2 has been fed to the lower part of the platen 1, the drive roller 6 is rotated to feed the sheet 2 to a predetermined position along the cylindrical surface 1a. In this manner, the stimulable phosphor sheet 2 is held as indicated by the chain line in FIG. 1 on the platen 1 at its first stop position. The lower part of the platen 1 is engaged with the screw rod 3 which is rotated by the motor 4 to move the platen 1 at a predetermined speed in the direction as indicated by the arrow A along the two guide rails 5, 5 between the first stop position indicated by the solid line in FIG. 1 and the second stop position indicated by the chain line. In this embodiment, the sub-scanning means is constituted by the screw rod 3, the motor 4 and the guide rails 5, 5.

The scanning optical system 8 as shown in FIG. 2 is provided above the platen 1, and the read-out of the image stored on the stimulable phosphor sheet 2 is carried out by the scanning optical system 8 in the same manner as mentioned above with reference to FIGS. 2 and 3.

At the time the image read-out is finished, the platen 1 has been moved to the position indicated by the chain line in FIGS. 1 and 4, and is stopped at this position (i.e. the second stop position). Thereafter, the roller 6 is rotated reversely to move the stimulable phosphor sheet 2 from the platen 1 to the second sheet conveyance system 70. The second sheet conveyance system 70 is then operated to convey the stimulable phosphor sheet 2 toward the housing magazine holding section 60. As shown in FIG. 6, the second sheet conveyance system 70 comprises a pair of rollers 71 and 72, endless belts 73, 73, ... applied around the rollers 71 and 72, and a motor 74 for rotating the roller 72 to rotate the endless belts 73, 73, ..., and conveys the stimulable phosphor sheet 2 normal to the direction of movement of the platen 1 indicated by the arrow A. During the conveyance, the erasing section 80 irradiates erasing light having a wavelength within the stimulation wavelength range for the stimulable phosphor sheet 2 to the sheet 2, thereby to release the radiation energy remaining on the sheet 2 after the image read-out is finished, and to make the sheet 2 reusable for radiation image recording. After the stimulable phosphor sheet 2 is taken out of the platen 1, the platen 1 is moved reversely to the direction during the image read-out, and is thus returned to its first stop position for carrying out the next image read-out.

At the housing magazine holding section 60, the housing magazine 61 is provided so that a sheet inlet 62 thereof faces the platen 1 at its second stop position. The second sheet conveyance system 70 linearly (normal to the direction of movement of the platen 1) conveys the stimulable phosphor sheet 2 from the platen 1 to the housing magazine 61. Also, the height of the housing magazine holding section 60 can be changed by a lifting device 63. By way of example, each time a single stimulable phosphor sheet 2 is housed in the housing magazine 61, the housing magazine holding section 60 is moved up or down by a distance equal to a single pitch of a sheet receiving plate of the housing magazine 61, so that an empty area in the housing magazine 61 aligns with the upper surfaces of the endless belts 73, 73, . . . Therefore, as the endless belts 73, 73, . . . are rotated by a predetermined distance, the stimulable phosphor sheet 2 placed thereon advances to the empty area in the housing magazine 61. After the most part of the single stimulable phosphor sheet 2 has advanced into the housing magazine 61, the edge portion of the sheet 2 is held by a sheet feed-in means 75 of the same type as the sheet take-out means 43, and pushed toward the housing magazine 61. In this manner, the stimulable phosphor sheet 2 is completely housed in the housing magazine 61.

In the case where the feed magazine 41 is constituted to house a plurality of the stimulable phosphor sheets 2, 2, . . . , the feed magazine holding section 40 should preferably be constituted so that the height thereof is changeable to eliminate a difference in height between the stimulable phosphor sheet 2 which is to be taken out of the feed magazine 41 and the upper surface of the endless belts 53, 53, . . .

The erasing section 80 need not necessarily be provided, and the housing magazine holding section 60 may be provided at a short distance from the platen 1 at its second stop position. In this case, the second sheet conveyance system 70 may be of a very simple configuration composed of, for example, a pair of nip rollers. Also, in the case where, for example, regulation of the sheet position is unnecessary, the first sheet conveyance system 50 need not necessarily be constituted long, and the feed magazine holding section 40 may be provided closer to the platen 1 at its first stop position.

After the stimulable phosphor sheet 2 which has been held on the platen 1 is taken out of the platen 1, the sheet 2 is often curled to some extent. Therefore, a conveyance means for bending the stimulable phosphor sheet 2 reversely to the direction of bending on the platen 1 may be incorporated in the second sheet conveyance system 70, thereby to eliminate curling of the sheet 2.

Figure 7:
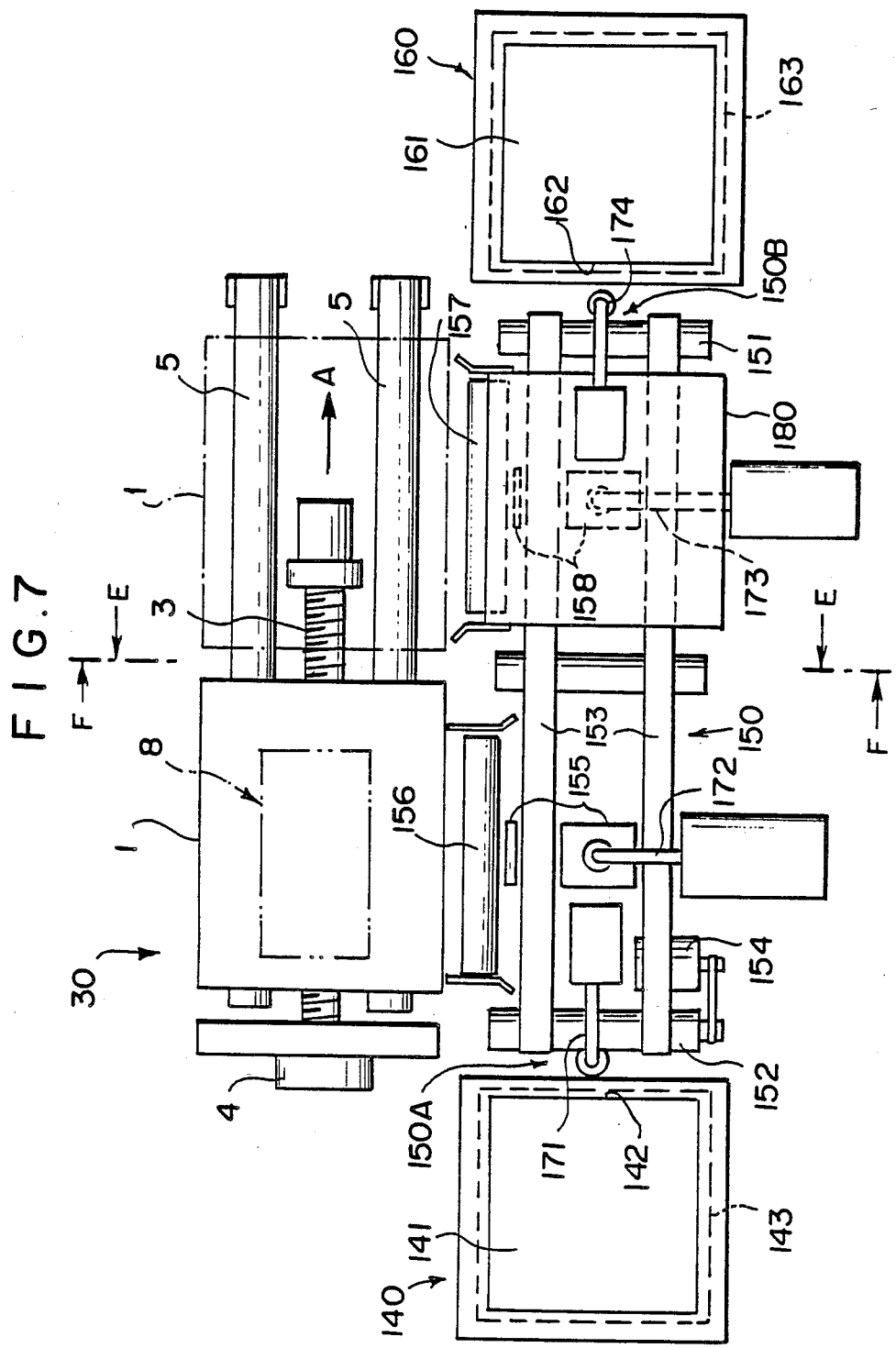
FIG. 7 is a plan view showing an embodiment of the third radiation image read-out apparatus in accordance with the present invention.
Figure 8:
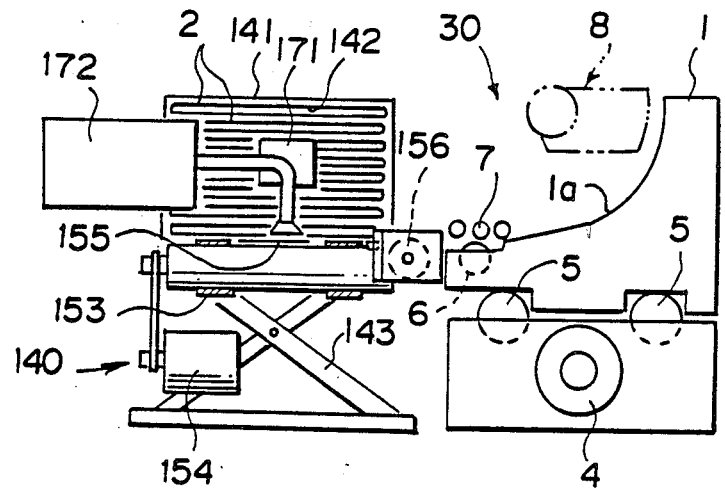
FIGS. 8 and 9 are side views showing a part of the embodiment shown in FIG. 7.
Figure 9:
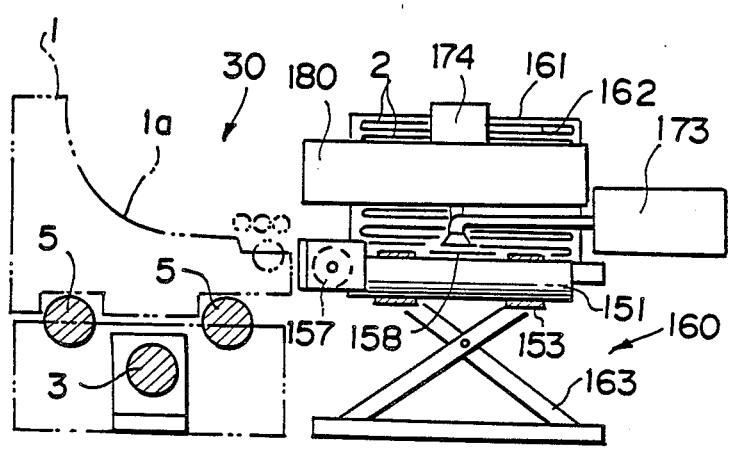

An embodiment of the third radiation image read-out apparatus in accordance with the present invention will hereinbelow be described with reference to FIGS. 7, 8 and 9. In FIGS. 7, 8 and 9, similar elements are numbered with the same reference numerals with respect to FIGS. 1, 2 and 3.

FIG. 7 showing the overall configuration of this embodiment, and FIGS. 8 and 9 are side views taken from the directions as indicated by the arrows E and F of FIG. 7. Basically, this embodiment comprises a read-out section 30, a feed magazine holding section 140, a sheet conveyance system 150 provided so that one end portion 150A thereof is close to the feed magazine holding section 140, a housing magazine holding section 160 provided close to the other end portion 150B of the sheet conveyance system 150, a first sheet transfer means 171, a second sheet transfer means 172, a third sheet transfer means 173, a fourth sheet transfer means 174, and an erasing section 180 provided above the other end portion 150B of the sheet conveyance system 150.

At the read-out section 30, a platen 1 as a sheet holding means is moved linearly in the direction as indicated by the arrow A between a first stop position indicated by the solid line in FIG. 7 and a second stop position indicated by the chain line. While the stimulable phosphor sheet 2 held on the platen 1 as will be described later is thus moved, the image read-out from the sheet 2 is carried out. The sheet conveyance system 150 is provided so that the one end portion 150A and the other end portion 150B are close to the platen 1 at its first stop position and the platen 1 at its second stop position, respectively.

A plurality of stimulable phosphor sheets 2, 2, . . . carrying a radiation image stored thereon by being exposed to radiation passing through an object such as the human body or to an electron beam passing through a sample in an electron microscope are housed in a feed magazine 141, and fed in this form to the radiation image read-out apparatus. Specifically, the feed magazine 141 is held at the feed magazine holding section 140 with a sheet outlet 142 of the feed magazine 141 facing the one end portion 150A of the sheet conveyance system 150. The stimulable phosphor sheets 2, 2, ... are taken out of the feed magazine 141 one by one by the first sheet transfer means 171 which may be composed of a moveable arm provided with an air suction cup at a lower edge. The stimulable phosphor sheet 2 thus taken out is placed on the sheet conveyance system 150.

By way of example, the sheet conveyance system 150 is constituted by endless belts 153, 153 which are applied around a pair of rollers 151 and 152 and which are provided parallel with the direction of movement of the platen 1, and a motor 154 for rotating the roller 152 to rotate the endless belts 153, 153. When a part of a single stimulable phosphor sheet 2 has been placed on the endless belts 153, 153, the motor 154 is operated by an instruction received from a control circuit (not shown), and the endless belts 153, 153 are thus rotated to convey the sheet 2 rightward in FIG. 7. At this time, the platen 1 is located at its first stop position. The motor 154 is stopped at the time the stimulable phosphor sheet 2 arrives at the position (lower than the platen 1 in FIG. 7) in front of the platen 1 at its first stop position. Thereafter, an edge portion of the stimulable phosphor sheet 2 is held by the second sheet transfer means 172 of the same type as the first sheet transfer means 171, and the sheet 2 is pushed by the second sheet transfer means 172 toward the platen 1 on the endless belts 153, 153. Sheet receiving plates 155, 155 are provided at the endless belts 153, 153 at the same heights as the heights of the endless belts 153, 153, and a guide roller 156 is provided between the inner endless belt 153 and the platen 1. The stimulable phosphor sheet 2 pushed toward the platen 1 as mentioned above slides on the sheet receiving plates 155, 155 and the guide roller 156 and is moved toward the platen 1.

As in the case of the embodiment shown in FIG. 4, the read-out section 30 in the embodiment shown in FIG. 7 is constituted in the same manner as illustrated in FIGS. 1, 2 and 3. Also, the scanning optical system 8 as shown in FIG. 2 is provided above the platen 1, and the read-out of the image stored on the stimulable phosphor sheet 2 is carried out by the scanning optical system 8 in the same manner as mentioned above with reference to FIGS. 2 and 3.

At the time the image read-out is finished, the platen 1 has been moved to the position indicated by the chain line in FIGS. 1 and 7, and is stopped at this position (i.e. the second stop position). Thereafter, the roller 6 is rotated reversely to move the stimulable phosphor sheet 2 from the platen 1 to the sheet conveyance system 150. A guide roller 157 is provided between the platen 1 at its second stop position and the inner endless belt 153, and sheet receiving plates 158, 158 of the same type as the sheet receiving plates 155, 155 are provided at the other end portion 150B of the sheet conveyance system 150. The stimulable phosphor sheet 2 is moved by sliding on the guide roller 157 and the sheet receiving plates 158, 158. After the most part of the stimulable phosphor sheet 2 has been fed onto the sheet conveyance system 150, the third sheet transfer means 173 of the same type as the second sheet transfer means 172 holds the edge portion of the sheet 2, and pulls the sheet 2 to the lower side in FIG. 7. As a result, the stimulable phosphor sheet 2 leaves the roller 6 and the rollers 7, 7, 7, and is completely placed on the endless belts 153, 153. At this time, the erasing section 180 irradiates erasing light having a wavelength within the stimulation wavelength range for the stimulable phosphor sheet 2 to the sheet 2, thereby to release the radiation energy remaining on the sheet 2 after the image read-out is finished, and to make the sheet 2 reusable for radiation image recording. Thereafter, the sheet holding by the third sheet transfer means 173 is released, and the motor 154 is operated to rotate the endless belts 153, 153 and to convey the stimulable phosphor sheet 2 toward the housing magazine holding section 160. After the stimulable phosphor sheet 2 is taken out of the platen 1, the platen 1 is moved reversely to the direction during the image read-out, and is thus returned to its first stop position for carrying out the next image read-out.

At the housing magazine holding section 160, the housing magazine 161 is provided so that a sheet inlet 162 thereof faces the other end portion 150B of the sheet conveyance system 150. The sheet conveyance system 150 conveys the stimulable phosphor sheet 2 toward the sheet inlet 162. Also, the height of the housing magazine holding section 160 can be changed by a lifting device 163. By way of example, each time a single stimulable phosphor sheet 2 is housed in the housing magazine 161, the housing magazine holding section 160 is moved up or down by a distance equal to a single pitch of a sheet receiving plate of the housing magazine 161, so that an empty area in the housing magazine 161 aligns with the upper surfaces of the endless belts 153, 153. Therefore, as the endless belts 153, 153 are rotated by a predetermined distance, the stimulable phosphor sheet 2 placed thereon advances to the empty area in the housing magazine 161. After the most part of the single stimulable phosphor sheet 2 has advanced into the housing magazine 161, the edge portion of the sheet 2 is held by the fourth sheet transfer means 174 of the same type as the first sheet transfer means 171, and pushed toward the housing magazine 161. In this manner, the stimulable phosphor sheet 2 is completely housed in the housing magazine 161.

In the case where the feed magazine 141 is constituted to house a plurality of the stimulable phosphor sheets 2, 2, ..., the feed magazine holding section 140 should preferably be provided with a lifting device 143 as shown in FIG. 8 of the same type as the lifting device 163 at the housing magazine holding section 160 so that the height of the feed magazine holding section 140 is changeable to eliminate a difference in height between the stimulable phosphor sheet 2 which is to be taken out of the feed magazine 141 and the upper surfaces of the endless belts 153, 153.

In the case where a plurality of the stimulable phosphor sheets 2, 2, ... housed in the feed magazine 141 are controlled appropriately, it is possible to know in advance that, for example, the radiation image recording was carried out erroneously on one of the stimulable phosphor sheets 2, 2, ... and said stimulable phosphor sheet 2 need not be subjected to the image read-out. In such a case, after the stimulable phosphor sheet 2 the image recording on which was erroneous is sent from the feed magazine 141 to the sheet conveyance system 150, the second sheet transfer means 172 and the third sheet transfer means 173 are not operated, and the sheet 2 is conveyed by the sheet conveyance system 150 parallel with the direction of movement of the platen 1, subjected to erasing by the erasing section 180, and housed in the housing magazine 161.

The feed magazine holding section 140 and the housing magazine holding section 160 may be provided on the side lower than the sheet conveyance system 150 in FIG. 7, and the stimulable phosphor sheet 2 may be moved linearly from the feed magazine 141 to the platen 1 and from the platen 1 to the housing magazine 161.

Figure 10:
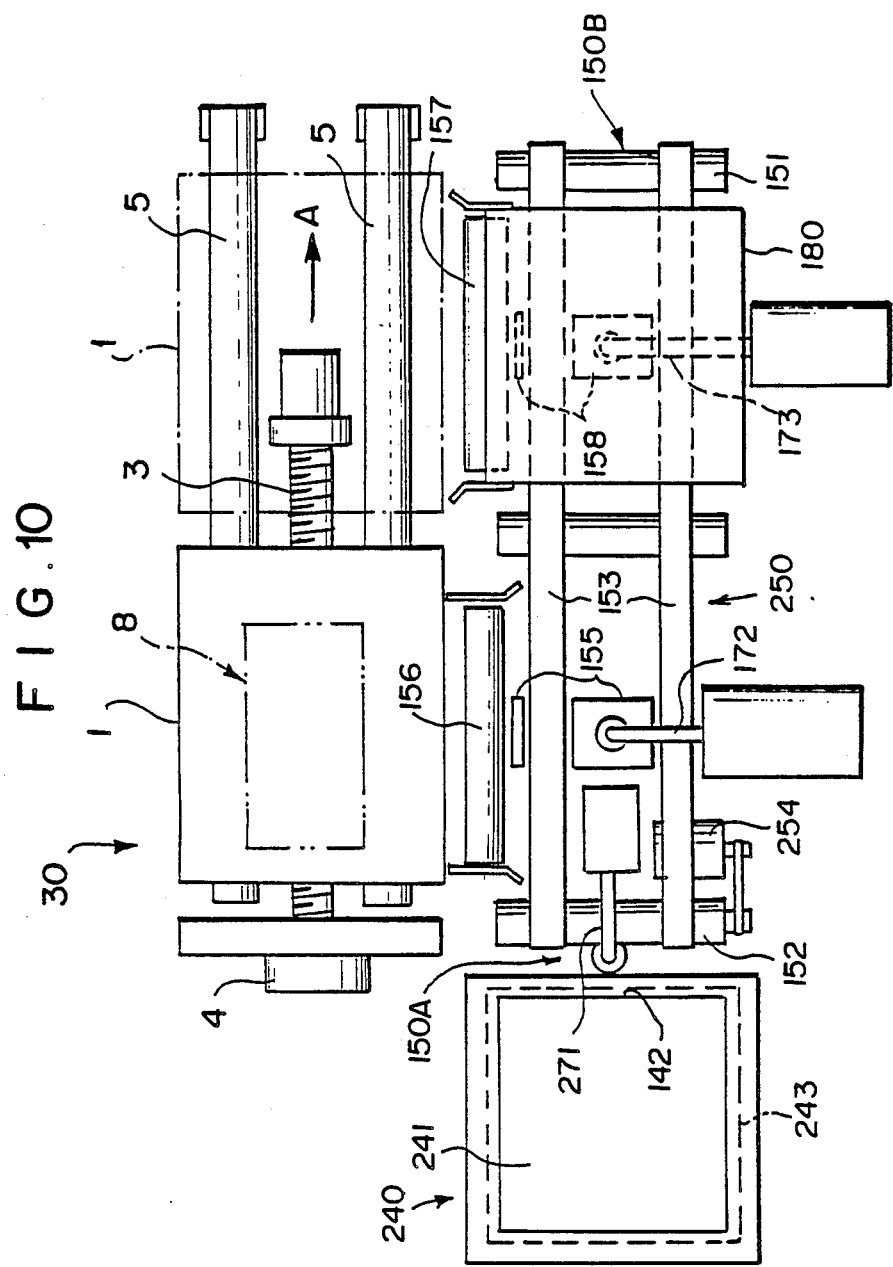
FIG. 10 is a plan view showing an embodiment of the fourth radiation image read-out apparatus in accordance with the present invention.

An embodiment of the fourth radiation image readout apparatus in accordance with the present invention will hereinbelow be described with reference to FIG. 10. In FIG. 10, similar elements are numbered with the same reference numerals with respect to FIG. 7. This embodiment is constituted by omitting the housing magazine holding section 160 and the fourth sheet transfer means 174 from the embodiment shown in FIG. 7. Also, a first sheet transfer means 271 is provided for transferring the stimulable phosphor sheet 2 from a magazine 241 to a sheet conveyance system 250 and reversely to this direction. A motor 254 of the sheet conveyance system 250 can be rotated normally and reversely, and the sheet conveyance system 250 can convey the stimulable phosphor sheet 2 from one end portion 250A to the other end portion 250B and reversely to this direction.

In this embodiment, take-out of the stimulable phosphor sheet 2 from the magazine 241, loading to the platen 1, radiation image read-out processing from the sheet 2, sheet feed to the sheet conveyance system 250, and erasing processing at the erasing section 180 are carried out in the same manner as in FIG. 7. However, in this embodiment, after the stimulable phosphor sheet 2 is placed on the sheet conveyance system 250 by the third sheet transfer means 173 and erasing processing is finished, the motor 254 is rotated reversely to the direction in the aforesaid case, and the stimulable phosphor sheet 2 is conveyed by the sheet conveyance system 250 leftward in FIG. 10. The height of a magazine holding section 240 is variable by a lifting device 243 of the same type as the lifting device 143 shown in FIG. 8, and the magazine holding section 240 is maintained at the same height as when the stimulable phosphor sheet 2 which is being conveyed in this manner was taken out of the magazine 241. Therefore, as the stimulable phosphor sheet 2 is conveyed in this manner, the sheet 2 advances to the area in the magazine 241 in which the sheet 2 was housed prior to the image read-out. At the time the most part of the stimulable phosphor sheet 2 has advanced into the magazine 241, the first sheet transfer means 271 is operated to push the sheet 2 leftward in FIG. 10 to the inner part of the magazine 241, and the sheet 2 leaves the sheet conveyance system 250 and is completely housed in the magazine 241.

After image read-out processing for the single stimulable phosphor sheet 2 is finished in this manner, the magazine holding section 240 is moved up or down by the lifting device 243 by a distance equal to a single pitch of the sheet receiving plate of the magazine 241. In this manner, the height of a stimulable phosphor sheet 2 adjacent the sheet 2 for which image read-out processing was finished coincides with the heights of the endless belts 153, 153. Thereafter, the adjacent sheet 2 is taken out of the magazine 241, and image read-out processing, erasing processing and housing in the magazine 241 are carried out in the same manner as mentioned above.

In the case where it is known in advance that one of the stimulable phosphor sheets 2, 2, ... in the magazine 241 need not be subjected to image read-out processing, the second sheet transfer means 172 is not operated, and the sheet 2 fed to the sheet conveyance system 250 is sent to the erasing section 180, subjected to erasing, and then returned to the magazine 241. Also, in the case where the erasing section 241 is not provided, the stimulable phosphor sheet 2 which need not be subjected to image read-out processing may not be taken out of the magazine 241. In this case, after said stimulable phosphor sheet 2 in the magazine 241 arrives at the predetermined take-out position (i.e. the position aligning with the height of the endless belts 153, 153), the magazine holding section 240 is further moved up or down by a distance equal to a single pitch of the sheet receiving plate of the magazine 241, thereby to maintain said sheet 2 housed in the magazine 241.

In the embodiments shown in FIGS. 7 and 10, the aforesaid erasing section 180 need not necessarily be provided, and the magazine 161 or 241 housing the stimulable phosphor sheets 2, 2, . . . for which image read-out processing has been finished may be sent to an independent erasing apparatus for carrying out erasing. Also, in the case where the erasing section 180 is incorporated in these embodiments, the position of the erasing section 180 is not limited to the position shown. For example, in the radiation image read-out apparatus provided with the single magazine 241, the erasing section 180 may be provided near the center of the sheet conveyance system 250 in the longitudinal direction thereof.

After the stimulable phosphor sheet 2 which has been held on the platen 1 is taken out of the platen 1, the sheet 2 is often curled to some extent. Therefore, a conveyance means for bending the stimulable phosphor sheet 2 reversely to the direction of bending on the platen 1 may be incorporated in the sheet conveyance system 150 or 250, thereby to eliminate curling of the sheet 2.

Embodiments of the fifth radiation image read-out apparatus in accordance with the present invention constituted to eliminate curling of the stimulable phosphor sheet will hereinbelow be described with reference to FIGS. 11, 12 and 13.

Figure 11:
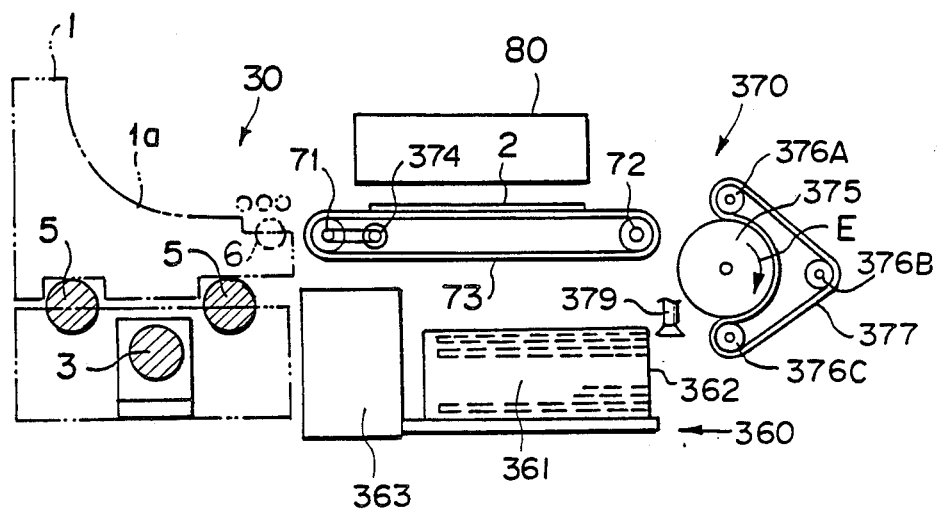
FIG. 11 is a side view showing a part of an embodiment of the fifth radiation image read-out apparatus in accordance with the present invention.
Figure 12:
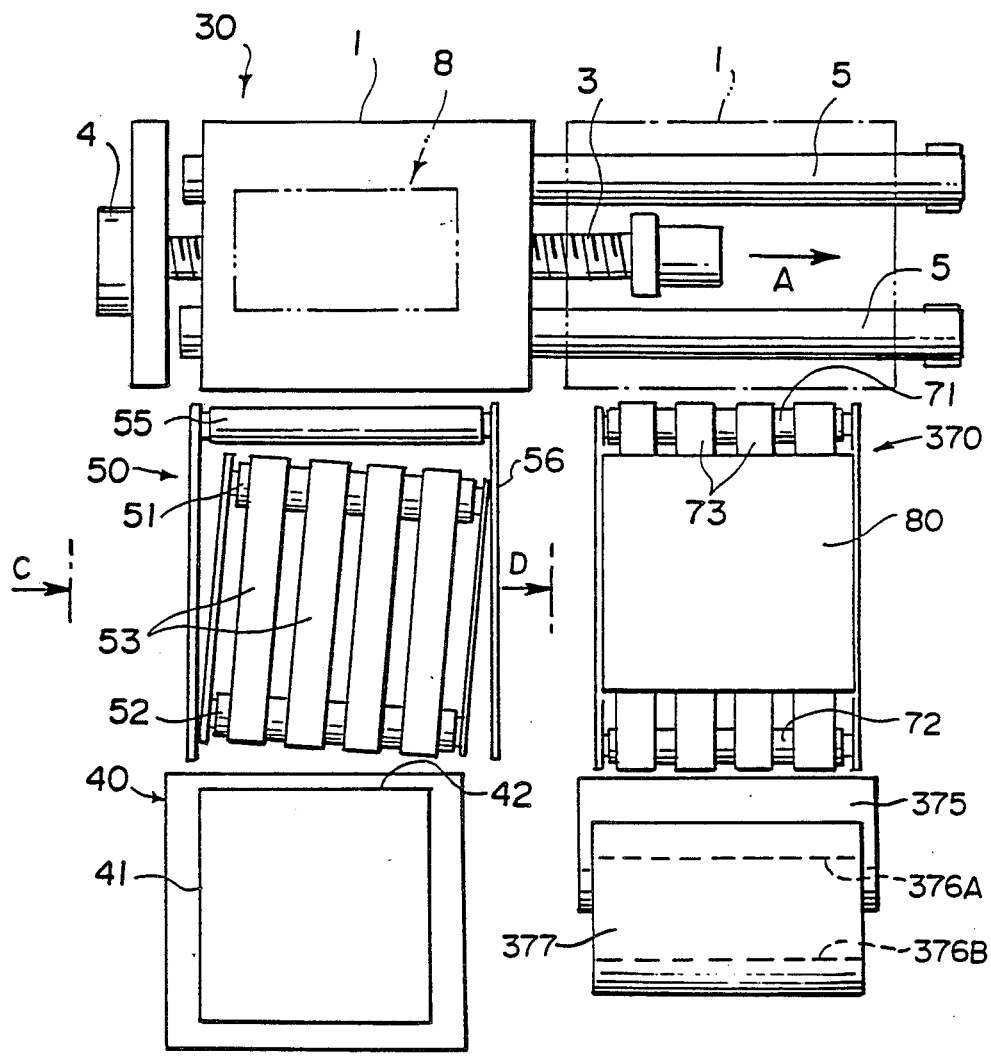
FIG. 12 is a general plan view showing the embodiment of FIG. 11.

FIG. 12 is a plan view showing the overall configuration of an embodiment of the fifth radiation image read-out apparatus in accordance with the present invention, and FIG. 11 is a side view taken from the direction indicated by the arrow D of FIG. 12. The side view taken from the direction indicated by the arrow C of FIG. 12 is the same as shown in FIG. 5. In FIGS. 11 and 12, similar elements are numbered with the same reference numerals with respect to FIGS. 4, 5 and 6.

Basically, this embodiment comprises the read-out section 30, the feed magazine holding section 40, the first sheet conveyance system 50 provided between the feed magazine holding section 40 and the read-out section 30, a housing magazine holding section 360, a second sheet conveyance system 370 for conveying the stimulable phosphor sheet 2 from the read-out section 30 to the housing magazine holding section 360, and the erasing section 80 provided above the second sheet conveyance system 370. This embodiment is constituted in the same manner as the embodiment shown in FIG. 4, except for the housing magazine holding section 360 and the second sheet conveyance system 370.

At the time the image read-out is finished in the manner as mentioned above, the platen 1 has been moved to the position indicated by the chain line in FIGS. 1 and 12, and is stopped at this position (i.e. the second stop position). Thereafter, the roller 6 is rotated reversely to move the stimulable phosphor sheet 2 from the platen 1 to the second sheet conveyance system 370. The second sheet conveyance system 370 is then operated to convey the stimulable phosphor sheet 2 toward the housing magazine holding section 360. As shown in FIG. 11, the second sheet conveyance system 370 comprises a pair of rollers 71 and 72, endless belts 73, 73, ... applied around the rollers 71 and 72, a motor 374 for rotating the roller 71 to rotate the endless belts 73, 73, ..., a reverse turn roller 375, and an endless belt 377 applied around rollers 376A, 376B and 376C, and conveys the stimulable phosphor sheet 2 normal to the direction of movement of the platen 1 indicated by the arrow A. During the conveyance, the erasing section 80 irradiates erasing light having a wavelength within the stimulation wavelength range for the stimulable phosphor sheet 2 to the sheet 2, thereby to release the radiation energy remaining on the sheet 2 after the image read-out is finished, and to make the sheet 2 reusable for radiation image recording. The erasing may instead be carried out with the stimulable phosphor sheet 2 maintained stationary. After the stimulable phosphor sheet 2 is taken out of the platen 1, the platen 1 is moved reversely to the direction during the image read-out, and is thus returned to its first stop position for carrying out the next image read-out.

At the housing magazine holding section 360, the housing magazine 361 is provided so that a sheet inlet 362 thereof faces the roller 376C. The second sheet conveyance system 370 conveys the stimulable phosphor sheet 2 from the platen 1 to the housing magazine 361. Also, the height of the housing magazine holding section 360 can be changed by a lifting device 363. By way of example, each time a single stimulable phosphor sheet 2 is housed in the housing magazine 361, the housing magazine holding section 360 is moved up or down by a distance equal to a single pitch of a sheet receiving plate of the housing magazine 361, so that an empty area in the housing magazine 361 aligns with a predetermined height. When the endless belts 73, 73, ... are rotated by a predetermined distance, the leading edge portion of the stimulable phosphor sheet 2 placed thereon enters between the upper part of the reverse turn roller 375 and the endless belt 377. At this time, the reverse turn roller 375 is rotated clockwise in FIG. 11 by a known drive source (not shown), and the rollers 376A, 376B and 376C are rotated counter-clockwise, so that the stimulable phosphor sheet 2 is conveyed in the direction as indicated by the arrow E between the reverse turn roller 375 and the endless belt 377. At the time of the aforesaid image readout, the stimulable phosphor sheet 2 is held on the platen 1 with the recording surface provided with the stimulable phosphor layer being bent concave. At the time the stimulable phosphor sheet 2 is conveyed along the circumferential surface of the reverse turn roller 375 as mentioned above, the recording surface of the sheet 2 is bent convex. Therefore, even though the sheet 2 is caused to curl to some extent by being held on the cylindrical surface 1a of the platen 1, the curl is eliminated when the sheet 2 is conveyed along the reverse turn roller 375. As the curl of the stimulable phosphor sheet 2 is eliminated, the sheet 2 is not entangled by a part of the housing magazine 361 during the feeding thereinto, and the sheet housing can be carried out smoothly.

The leading edge portion of the stimulable phosphor sheet 2 conveyed to the lower side of the reverse turn roller 375 advances into the empty area in the housing magazine 361. After the most part of the single stimulable phosphor sheet 2 has advanced into the housing magazine 361, the edge portion of the sheet 2 is held by a sheet feed-in means 379 of the same type as the sheet take-out means 43 shown in FIG. 5, and pushed toward the housing magazine 361. In this manner, the stimulable phosphor sheet 2 is completely housed in the housing magazine 361.

The erasing section 80 need not necessarily be provided, and the stimulable phosphor sheet 2 housed in the housing magazine 361 may be sent to an independent erasing apparatus for carrying out erasing.

Another embodiment of the fifth radiation image read-out apparatus in accordance with the present invention will hereinbelow be described with reference to FIG. 13. In FIG. 13, similar elements are numbered with the same reference numerals with respect to FIG. 11.

The read-out section 30 in this embodiment is nearly the same as in the embodiment shown in FIG. 12, and the drive roller 6 and the rollers 7, 7, 7 are provided above the platen 1. Also, the reverse turn roller 375, the rollers 376A, 376B and 376C, and the endless belt 377 are of the same type as in the embodiment shown in FIG. 12, and are provided so that the reverse turn roller 375 is close to the platen 1 at its fist stop position from above. Moreover, the reverse turn roller 375, and the rollers 376A, 376B and 376C are rotatable in the normal and reverse directions. On the other hand, a single magazine 391 is used to accommodate the stimulable phosphor sheets 2, 2, 2 and is supported on a magazine holding section 390 with a sheet inlet/outlet 392 facing the reverse turn roller 375. The height of the magazine holding section 390 can be changed by a lifting device 393.

The stimulable phosphor sheets 2, 2, 2 are housed in the magazine 391 with the recording surfaces facing up. The stimulable phosphor sheets 2, 2, 2 are taken out of the magazine 391 one by one by a sheet transfer means 394 of the same type as the aforesaid sheet take-out means 43 or the aforesaid sheet feed-in means 379. The leading edge portion of the stimulable phosphor sheet 2 thus taken out of the magazine 391 slides on a guide plate 395 and is entered between the reverse turn roller 375 and the roller 376A. Thereafter, the reverse turn roller 375 is rotated clockwise in FIG. 13, and the rollers 376A, 376B and 376C are rotated counter-clockwise, and the stimulable phosphor sheet 2 is conveyed between the reverse turn roller 375 and the endless belt 377.

The stimulable phosphor sheet 2 is thus fed onto the rollers 7, 7, 7, sent by the drive roller 6, and held on the cylindrical surface 1a of the platen 1 at its first stop position. Image read-out processing from the stimulable phosphor sheet 2 is carried out in the same manner as mentioned above.

When image read-out processing is finished, the platen 1 is moved reversely from its second stop position to its first stop position. At the time the platen 1 is stopped at its first stop position, the drive roller 6, the reverse turn roller 375, and the rollers 376A, 376B and 376C are rotated reversely to the directions in the aforesaid case. As a result, the stimulable phosphor sheet 2 is taken out of the platen 1, and conveyed reversely to the direction in the aforesaid case between the reverse turn roller 375 and the endless belt 377. In this manner, the stimulable phosphor sheet 2 is projected from between the reverse turn roller 375 and the roller 376A onto the guide plate 395, slides along the guide plate 395, and enters the magazine 391. After the most part of the stimulable phosphor sheet 2 enters the magazine 391 and the sheet 2 leaves the reverse turn roller 375, the sheet transfer means 394 holds the edge portion of the sheet 2 and pushes the sheet 2 toward the magazine 391. In this manner, the sheet 2 is housed in the magazine 391.

Figure 13:
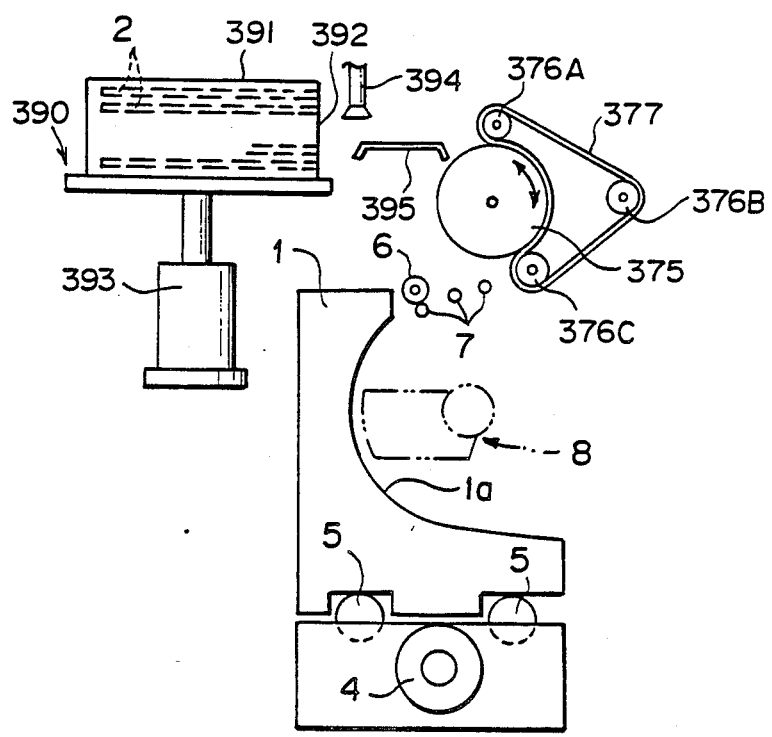
FIG. 13 is a side view showing the major part of another embodiment of the fifth radiation image read-out apparatus in accordance with the present invention.

In the embodiment shown in FIG. 13, the stimulable phosphor sheet 2 is bent reversely to the direction of bending on the platen 1 at the time the sheet 2 is conveyed along the reverse turn roller 375 from the magazine 391 to the platen 1 or from the platen 1 to the magazine 391. Therefore, the stimulable phosphor sheet 2 housed in the magazine 391 after the image read-out is finished is free from curl, and sheet housing can be carried out smoothly.

In this embodiment, the stimulable phosphor sheet 2 is conveyed twice, i.e. before and after the image read-out, along the reverse turn roller 375. Therefore, this embodiment is suitable for the case where, for example, the stimulable phosphor sheet 2 is held for a comparatively long time on the platen 1, or is caused to curl to a high extent by the cylindrical surface 1a of the platen 1 having a small curvature radius.

In the embodiments shown in FIGS. 12 and 13, the stimulable phosphor sheet 2 is passed through the sheet conveyance system for elimination of curl after the image read-out, or before and after the image read-out. However, the fifth radiation image read-out apparatus in accordance with the present invention may also be constituted to pass the stimulable phosphor sheet 2 through the sheet conveyance system only before image read-out processing. Also, the sheet conveyance system for elimination of curl of the stimulable phosphor sheet 2 is not limited to the system composed of the reverse turn roller 375, the rollers 376A, 376B and 376C, and the endless belt 377, and may be composed of any known mechanism.

Embodiment of the electron microscope image read-out apparatus in accordance with the present invention will hereinbelow be described with reference to FIGS. 14 to 19.

Figure 14:
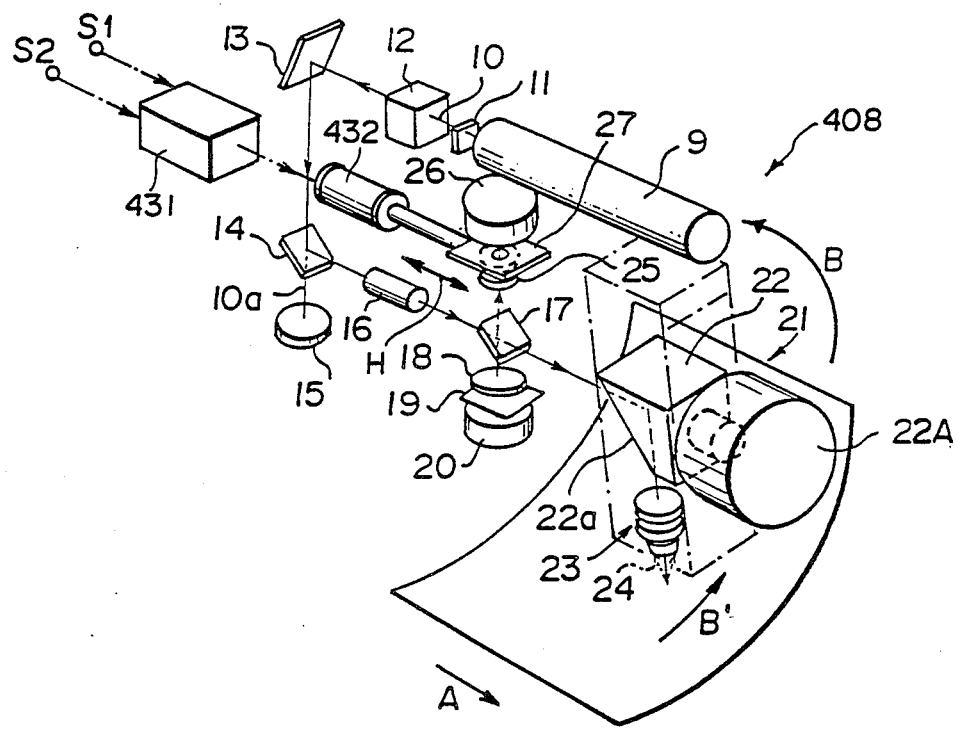
FIGS. 14 and 15 are a perspective view and a front view showing the scanning optical system in an embodiment of the electron microscope image read-out apparatus in accordance with the present invention.
Figure 15:
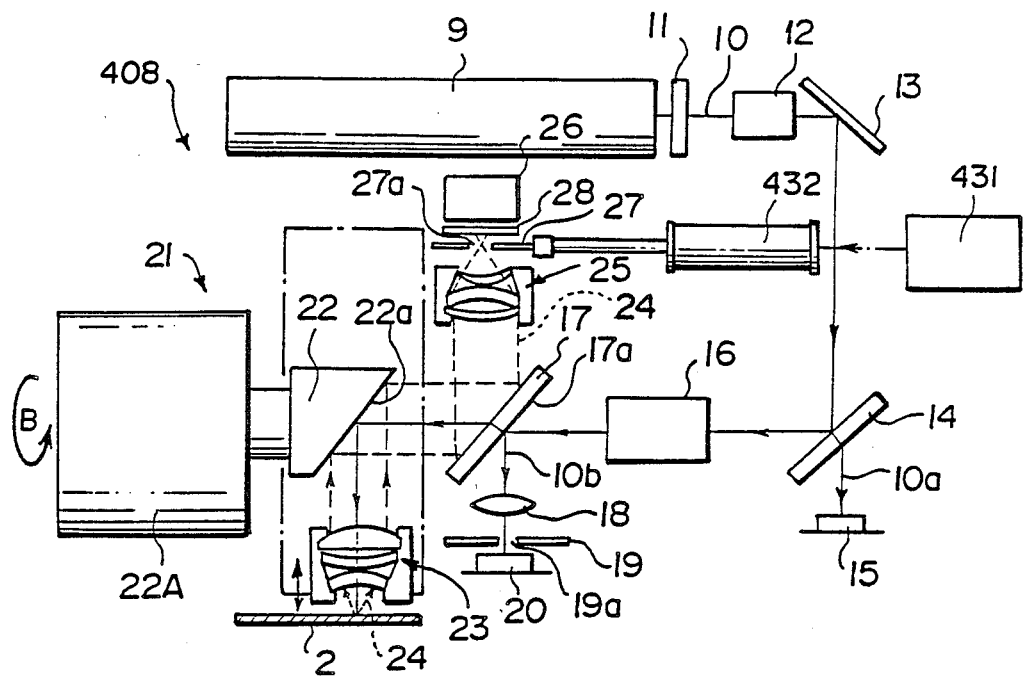
Figure 16:
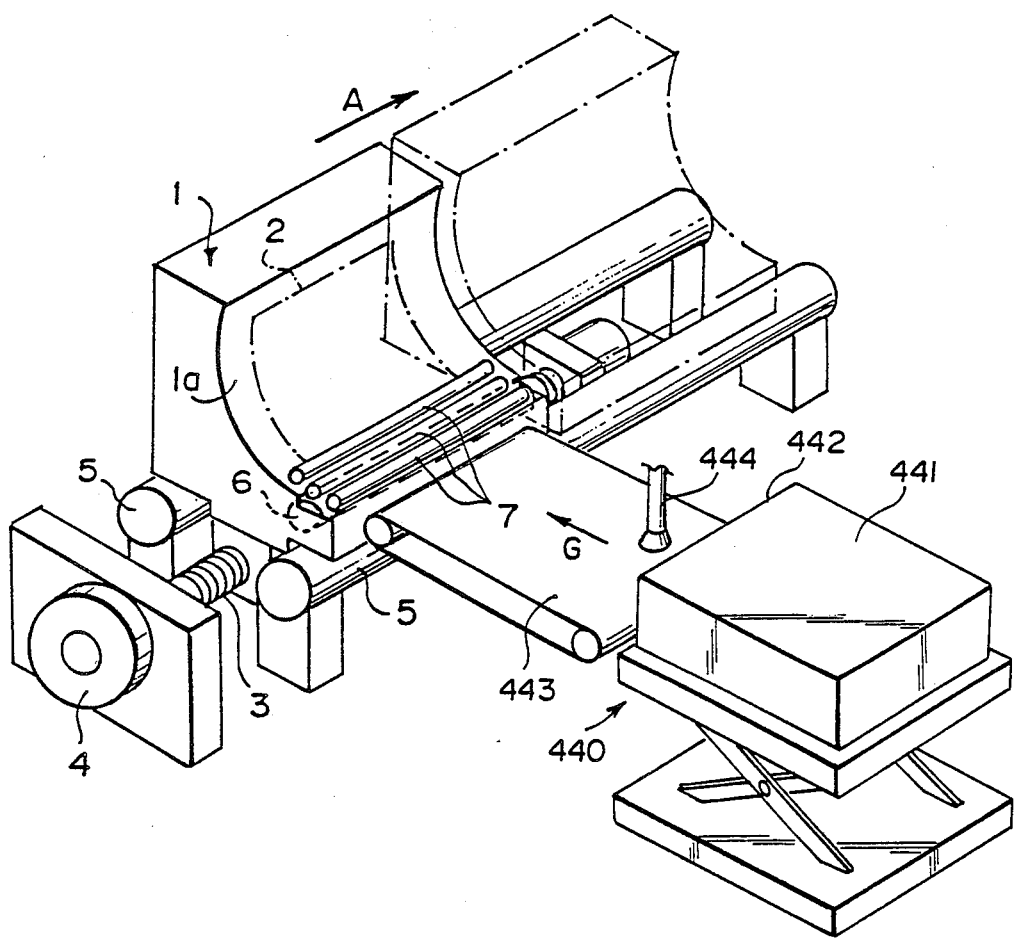
FIG. 16 is a perspective view showing the sheet holding means and the sub-scanning means in the embodiment shown in FIGS. 14 and 15.
Figure 17:
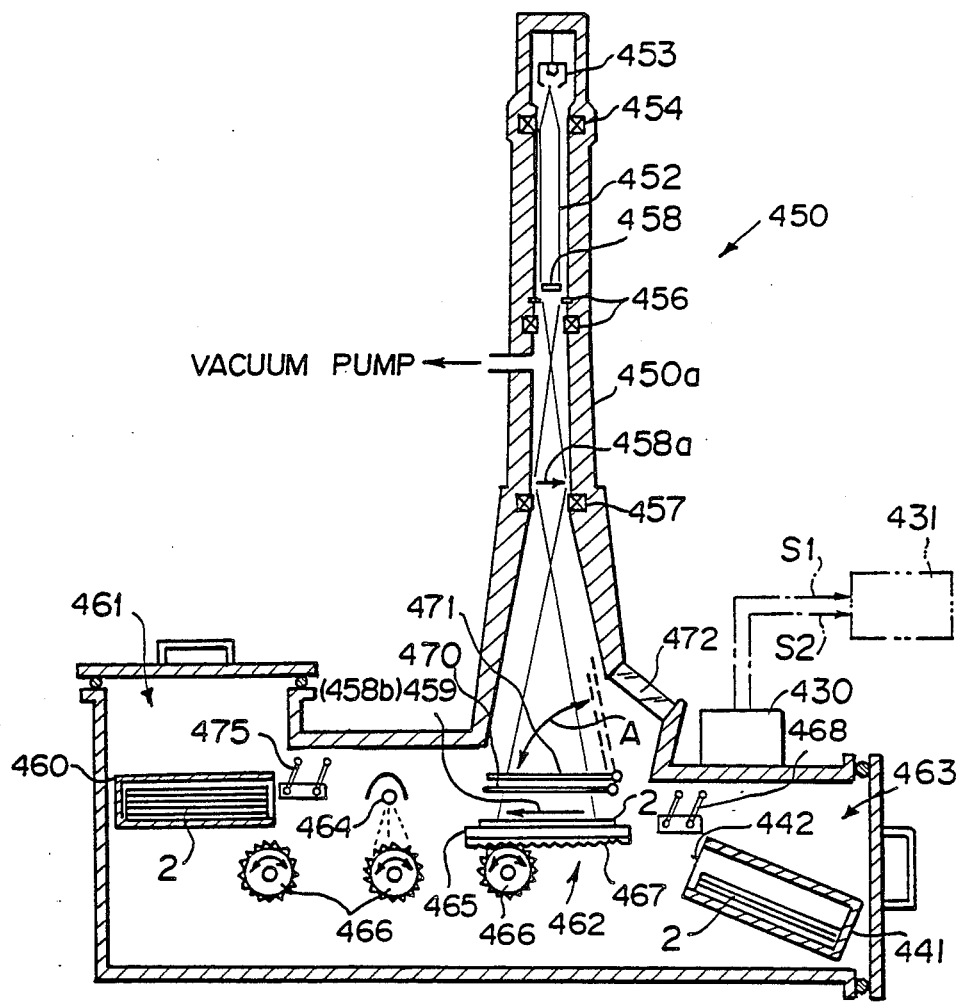
FIG. 17 is a schematic view showing an example of an apparatus for recording an electron microscope image.
Figure 18:
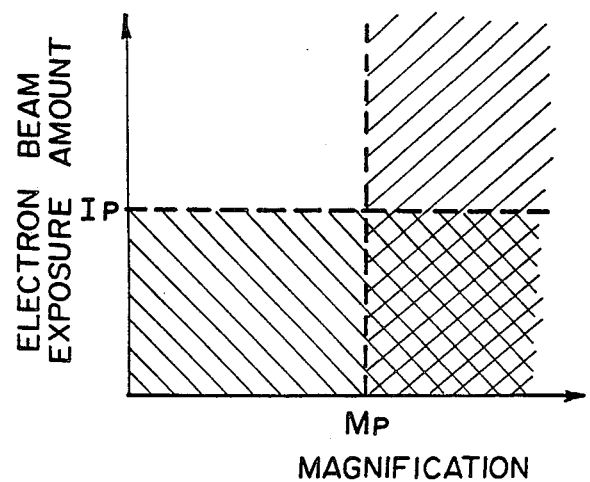
FIG. 18 is an explanatory view showing changeover of the size of the aperture in the embodiment shown in FIGS. 14 and 15.

FIGS. 14, 15 and 16 show an embodiment of the electron microscope image read-out apparatus in accordance with the present invention, and FIG. 17 shows an apparatus for recording an electron microscope image on a two-dimensional sensor. Recording of the electron microscope image will first be described with reference to FIG. 17.

A microscope body 450a of an electron microscope 450 is provided with an electron gun 453 for producing an electron beam 452 at a uniform speed, at least one converging lens 454 composed of a magnetic lens, an electrostatic lens or the like for converging the electron beam 452 onto a sample plane, a sample supporting base 455, an objective lens 456 of the same type as the converging lens 454, and a projection lens 457. The electron beam 452 passing through a sample 458 disposed on the sample supporting base 455 is refracted by the objective lens 456 to form an enlarged scattering image 458a of the sample 458. The enlarged scattering image 458a is projected by the projection lens 457 onto a plane of image formation 459 and forms an image 458b.

An electron microscope image recording apparatus is provided under the microscope body 450a of the electron microscope 450. The electron microscope image recording apparatus is provided with a sensor feed section 461 for accommodating a feed magazine 460 housing a plurality of stimulable phosphor sheets 2, 2, ... as two-dimensional sensors, a recording section 462 formed to include the plane of image formation 459, and a sensor housing section 463 for accommodating a housing magazine 441 of the same type as the feed magazine 460. An erasing light source 464 is provided between the sensor feed section 461 and the recording section 462. A horizontally-moveable sheet feed table 465 is provided between the sensor feed section 461 and the recording section 462. A rack 467 for engagement with gears 466, 466, 466 is secured to the sheet feed table 465, so that the sheet feed table 465 is moved horizontally when the gears 466, 466, 466 are rotated. The sensor feed section 461 is provided with a sheet take-out means 475 composed of, for example, a moveable arm which holds an end of the phosphor sheet 2. Also, the sensor housing section 463 is provided with a sheet feed-in means 468 for holding the stimulable phosphor sheet 2 at the recording section 462 and feeding the sheet 2 to the housing magazine 441. The sheet feed-in means 468 is composed of, for example, a movable arm similar to said sheet take-out means 475. A shutter 470 and a fluorescent screen 471 which are rotatable by levers (not shown) in the direction as indicated by the arrow A in FIG. 17 are provided between the microscope body 450a and the electron microscope image recording apparatus. An inspection window 472 provided with a lead glass or the like is provided in the circumferential wall of the microscope body 450a above the shutter 470.

During the operation of the electron microscope 450, the inside of the microscope body 450 a and the inside of the electron microscope image recording apparatus are maintained in a vacuum by a known evacuation device. A known shielding member (not shown) is provided between the microscope body 450a and the electron microscope image recording apparatus for shielding the inside of the microscope body 450a and the inside of the electron microscope image recording apparatus from each other, so that the inside of the microscope body 450a is maintained in a vacuum even though the vacuum in the electron microscope image recording apparatus breaks at the time the feed magazine 460 is fed to the apparatus or the housing magazine 441 is removed therefrom.

When an electron microscope image is to be recorded, the feed magazine 460 housing a plurality of the stimulable phosphor sheets 2, 2, ... is accommodated in the sensor feed section 461, and the empty housing magazine 441 is accommodated in the sensor housing section 463. Also, the shutter 470 and the fluorescent screen 471 are located at the positions (horizontal positions in FIG. 17) intercepting the electron beam 452. A single stimulable phosphor sheet 2 is taken by the sheet take-out means 475 out of the feed magazine 460 and placed on the sheet feed table 465. The gears 466, 466, 466 are then rotated clockwise to move the sheet feed table 465 rightward and to send the stimulable phosphor sheet 2 to the recording section 462. At the time the stimulable phosphor sheet 2 is thus sent, the erasing light source 464 is turned on to erase the radiation energy remaining on the sheet 2. The sheet feed table 465 is stopped when the sheet 2 is located at the plane of image formation 459. The electron beam 452 impinges upon the fluorescent screen and causes it to produce fluorescence, and therefore an enlarged scattering image 458a which the electron beam 452 carries can be viewed through the inspection window 472. After the focusing point, the magnification and the field range of the enlarged scattering image 458a are adjusted by the viewing through the inspection window 471, the shutter 470 and the fluorescent screen 471 are rotated by the levers to the positions that do not intercept the electron beam 452. Accordingly, the electron beam 452 impinges upon the stimulable phosphor sheet 2 at the recording section 462, and the electron beam energy carrying the enlarged scattering image 458b is stored on the sheet 2.

After the stimulable phosphor sheet 2 is exposed to the electron beam 452, the shutter 470 is closed, and the sheet 2 carrying the enlarged scattering image 458a stored thereon is fed by the sheet feed-in means 468 into the housing magazine 441. The gears 466, 466, 466 are then rotated reversely to return the sheet feed table 465 to the sensor feed section 461. Thereafter, the sheet feed table 465 feeds the next stimulable phosphor sheet 2 from the feed magazine 460 to the recording section 462 in the same manner as mentioned above for the next recording of an electron microscope image.

The aforesaid operations are repeated, and a plurality of the image-recorded stimulable phosphor sheets 2, 2, . . . are housed in the housing magazine 441. After a series of electron microscope image recording operations are finished, the housing magazine 441 is taken out of the sensor housing section 463 and sent to the image read-out step.

Each time the electron microscope image is recorded on a single stimulable phosphor sheet 2 in the manner as mentioned above, a controller 430 of the electron microscope 450 generates signals S1 and S2 representing the magnification and the electron beam exposure amount respectively adjusted in the recording step. The signals S1 and S2 are fed to an aperture control circuit 431 of the electron microscope image read-out apparatus as will be described later.

Read-out of the electron microscope image stored on the stimulable phosphor sheet 2 will hereinbelow be described with reference to FIGS. 14, 15 and 16. In FIGS. 14, 15 and 16, similar elements are numbered with the same reference numerals with respect to FIGS. 1, 2 and 3. The magazine 441 housing a plurality of the image-recorded stimulable phosphor sheets 2, 2, ... is held on a magazine holding section 440 shown in FIG. 16. A sheet conveyance means 443 composed of an endless belt or the like is provided between the magazine holding section 440 and the read-out apparatus. The magazine 441 is held with a sheet inlet/outlet 442 thereof facing the sheet conveyance means 443. Thereafter, an edge portion of a single stimulable phosphor sheet 2 in the magazine 441 is held by a sheet take-out means 444 composed of, for example, a moveable arm provided with an air suction cup at a lower edge, and the sheet 2 is pulled toward the sheet conveyance means 443 and placed thereon. The sheet conveyance means 443 is then operated to convey the stimulable phosphor sheet 2 in the direction as indicated by the arrow G.

The platen 1 as the sheet holding means has the inwardly convex cylindrical surface 1a, and the drive roller (lower roller) 6 and the rollers (upper rollers) 7, 7, 7 are provided close to the lower edge portion of the cylindrical surface 1a. At the time the stimulable phosphor sheet 2 is conveyed by the sheet conveyance means 443 and the leading edge of the sheet 2 has been fed to the lower part of the platen 1, the drive roller 6 is rotated to feed the sheet 2 to a predetermined position along the cylindrical surface 1a. In this manner, the stimulable phosphor sheet 2 is held as indicated by the chain line in FIG. 16 on the platen 1. The lower part of the platen 1 is engaged with the screw rod 3 which is rotated by the motor 4 to move the platen 1 at a predetermined speed in the direction as indicated by the arrow A along the two guide rails 5, 5 between the position indicated by the solid line in FIG. 16 and the position indicated by the chain line. In this embodiment, the sub-scanning means is constituted by the screw rod 3, the motor 4 and the guide rails 5, 5.

A scanning optical system 408 as shown in FIGS. 14 and 15 is provided above the platen 1, and the read-out of the image stored on the stimulable phosphor sheet 2 is carried out by the scanning optical system 408 in the same manner as mentioned above with reference to FIGS. 2 and 3.

At the time the image read-out is finished, the platen 1 has been moved to the position indicated by the chain line in FIG. 16, and is stopped at this position. Thereafter, the roller 6 is rotated reversely to move the stimulable phosphor sheet 2 from the platen 1 to a sheet conveyance system (not shown in FIG. 16).

The aperture plate 27 at the scanning optical system 408 is moved by a plunger device 432 as an aperture changing means in the direction as indicated by the arrow H in FIG. 14 between a position in the optical path of the light 24 emitted by the stimulable phosphor sheet 2 and a position away from the optical path.

The operation of the plunger device 432 for moving the aperture plate 27 is controlled by the aperture control circuit 431. Specifically, the aperture control circuit 431 sequentially stores the signals S1 and S2, which are received when the electron microscope image is stored on each of the stimulable phosphor sheets 2, 2, ..., in an internal memory. At the time the stimulable phosphor sheet 2 is taken out of the magazine 441 and subjected to the image read-out, the aperture control circuit 431 reads the signals S1 and S2 with respect to the sheet 2 subjected to the image read-out from the memory, and operates the plunger device 432 to retract the aperture plate 27 from the optical path of the emitted light 24 in the case where the magnification of the electron microscope which the signal S1 represents is not lower than a predetermined value Mp as indicated by hatching in FIG. 18, or the electron beam exposure amount which the signal S2 represents is not larger than a predetermined value Ip. In the case where the conditions are outside of the hatched region in FIG. 18, i.e. when the magnification of the electron microscope is lower than the predetermined value Mp and, at the same time, the electron beam exposure amount is larger than the predetermined value Ip, the aperture control circuit 431 controls the operation of the plunger device 432 so that the aperture plate 27 enters the optical path of the emitted light 24.

In order to accurately achieve the correspondence of the stimulable phosphor sheets 2, 2, ... and the signals S1, S2 to each other, the sequence of use of the sheets 2, 2, ... may be made the same between the recording and read-out of the electron microscope images, and the signals S1 and S2 may be read from the memory in the same sequence as the signal storage in the memory. In the case where a plurality of magazines 441, 441, ... used in the electron microscope image recording are not necessarily fed to the read-out apparatus in the same sequence as the use in the recording, identification information on the magazines 441, 441, ... may be stored together with the signals S1 and S2 when the signals S1. At the time of the image read-out, the identification information indicated by the provision of, for example, a bar code on the magazine 441, may be detected, and the stored signals corresponding to the identification information thus detected may be read from the memory. Alternatively, all of the stimulable phosphor sheets 2, 2, ... used may be provided with identification information by means of bar codes or the like. At the time of storage and reading of the signals S1 and S2 in the memory, the identification information may be detected, and the signals S1 and S2 may be stored and read to correspond to the identification information.

When the emitted light 24 is detected via the aperture 27a of the aperture plate 27, the adverse effects of the flare phenomenon can be eliminated, and the sharpness of the read-out image can be increased. On the other hand, when the emitted light 24 is detected with the aperture plate 27 retracted from the optical path of the emitted light 24, the optical amount received by the photomultiplier 26 increases, and high-sensitivity image read-out can be achieved. In the case where the magnification of the electron microscope is comparatively high, i.e. not lower than the predetermined value Mp, the recorded image originally has a high resolution, and therefore increase in the sharpness is not particularly required in the image read-out. Therefore, in this case, the aperture plate 27 is retracted from the optical path of the emitted light 24, so that the read-out sensitivity increases and a bright electron microscope image of good graininess is reproduced. On the other hand, in the case where the magnification of the electron microscope is comparatively low, i.e. lower than the predetermined value Mp, high-sharpness image read-out can be carried out by entering the aperture plate 27 to the optical path of the emitted light 24.

Also, in the case where the electron beam exposure amount is smaller than the predetermined value Ip and the recording sensitivity is comparatively low, the aperture plate 27 is retracted from the optical path of the emitted light 24, so that high-sensitivity image read-out is achieved by the compensation for the low recording sensitivity. On the other hand, in the case where the electron beam exposure amount is larger than the predetermined value Ip and the recording sensitivity is substantially high, the aperture plate 27 is entered to the optical path of the emitted light 24, so that high-sharpness image read-out is achieved without unnecessarily increasing the read-out sensitivity.

Figure 19:
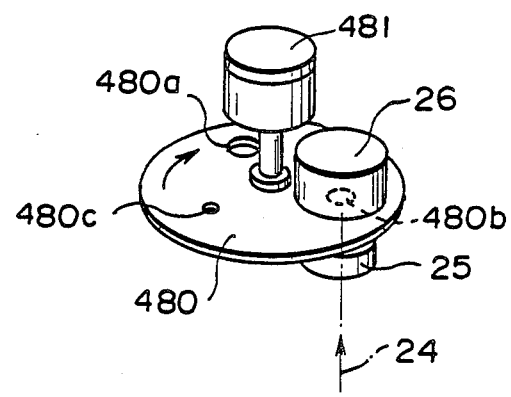
FIG. 19 is a perspective view showing another examples of the aperture plate and the aperture changing means used in the electron microscope image read-out apparatus in accordance with the present invention.

In the aforesaid embodiment of the electron microscope image read-out apparatus, the aperture plate 27 is set to the condition inserted into the optical path of the emitted light and the condition retracted therefrom (wherein the size of the aperture is infinitely large). However, the magnification of the electron microscope or the recording sensitivity may be divided into three or more ranges, and the aperture size may be changed for each of these ranges. Also, as shown in FIG. 19, in order to change the aperture size, instead of inserting the single aperture plate 27 into the optical path and retracting it from the optical path, a single rotatable aperture plate 480 may be provided with apertures 480a, 480b and 480c having different sizes and rotated by a step motor 481 or the like so that the aperture 480a, 480b or 480c having the desired size is located between the detection lens 25 and the photomultiplier 26. Furthermore, the aperture plate of may formed as in the case of a stop of a camera, and the aperture size may be changed directly.

Moreover, instead of changing the aperture size in accordance with both the magnification of the electron microscope and the recording sensitivity, the aperture size may be changed in accordance with only one of the magnification of the electron microscope and the recording sensitivity. As the information representing the recording sensitivity in the electron microscope, the information on the sensitivity of the stimulable phosphor sheet or the like may be utilized instead of the electron beam exposure amount.

We claim:

1. A radiation image read-out apparatus for reading out a radiation image stored on a stimulable phosphor sheet by scanning the stimulable phosphor sheet carrying the radiation image stored thereon with stimulating rays which cause the stimulable phosphor sheet to emit light in proportion to the stored radiation energy, and photoelectrically detecting the emitted light,
   wherein the improvement comprises the provision of:
   (i) a sheet holding means for holding said stimulable phosphor sheet thereon in a cylindrical surface form,
   (ii) a stimulating ray source for producing said stimulating rays,
   (iii) a semi-transparent mirror provided in an optical path of said stimulating rays for transmitting and/or reflecting the incident stimulating rays,
   (iv) a spinner provided with a deflection mirror for reflecting said stimulating rays coming from said semi-transparent mirror toward said stimulable phosphor sheet on the center axis of said cylindrical surface, and a condensing lens provided in the optical path of said stimulating rays reflected by said deflection mirror for converging said stimulating rays on said stimulable phosphor sheet, said spinner rotating said deflection mirror and said condensing lens together coaxially with respect to said center axis, thereby to scan said stimulating rays in a main scanning direction on said stimulable phosphor sheet,
   (v) a sub-scanning means for moving said sheet holding means with respect to said spinner in parallel with said center axis,
   (vi) a detection lens provided in an optical path of said light emitted by said stimulable phosphor sheet, passing through said condensing lens and coming from said semi-transparent mirror, said detection lens converging said emitted light,
   (vii) an aperture plate provided at a position of convergence of said emitted light by said detection lens and having an aperture of a size allowing the passage of only said emitted light thus converged therethrough, and
   (viii) a photodetector provided at the rear of said aperture plate.

2. An apparatus as defined in claim 1 wherein said semi-transparent mirror is a dichroic mirror for selectively transmitting one of said stimulating rays and said emitted light and selectively reflecting the other thereof.

3. A radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet on the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet,
   wherein the improvement comprises the provision of:
   (i) a feed magazine housing stimulable phosphor sheets prior to the image read-out therein, and provided so that a sheet outlet of said feed magazine faces said platen at a first stop position where said movement is started,
   (ii) a first sheet conveyance system for conveying the stimulable phosphor sheet from said feed magazine to said platen, said first sheet conveyance system being provided to convey the stimulable phosphor sheet approximately normal to a direction of said movement of said platen,
   (iii) a housing magazine for housing stimulable phosphor sheets for which the image read-out has been finished, said housing magazine being provided so that a sheet inlet thereof faces said platen at a second stop position where said movement is finished, and
   (iv) a second sheet conveyance system for conveying the stimulable phosphor sheet from said platen to said housing magazine, said second sheet conveyance system being provided to convey the stimulable phosphor sheet approximately parallel with the direction of sheet conveyance of said first sheet conveyance system.

4. An apparatus as defined in claim 3 wherein the height of said feed magazine and/or the height of said housing magazine is changeable by a lifting device.

5. A radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet on the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet, wherein the improvement comprises the provision of:
(i) a sheet conveyance system provided so that one end portion and the other end portion thereof are respectively close to said platen at a first stop position where said movement is started and said platen at a second stop position where said movement is finished, said sheet conveyance system conveying the stimulable phosphor sheet approximately parallel with a direction of said movement of said platen from said one end portion to said other end portion,
(ii) a feed magazine housing stimulable phosphor sheets prior to the image read-out therein, and provided close to said one end portion of said sheet conveyance system,
(iii) a housing magazine for housing stimulable phosphor sheets for which the image read-out has been finished, said housing magazine being provided close to said other end portion of said sheet conveyance system,
(iv) a first sheet transfer means for transferring the stimulable phosphor sheet from said feed magazine to said sheet conveyance system,
(v) a second sheet transfer means for transferring the stimulable phosphor sheet from said sheet conveyance system to said platen at said first stop position,
(vi) a third sheet transfer means for transferring the stimulable phosphor sheet from said platen at said second stop position to said sheet conveyance system, and
(vii) a fourth sheet transfer means for transferring the stimulable phosphor sheet from said sheet conveyance system to said housing magazine.

6. An apparatus as defined in claim 5 wherein the height of said feed magazine and/or the height of said housing magazine is changeable by a lifting device.

7. A radiation image read-out apparatus for holding a single stimulable phosphor sheet, which is taken out of a magazine housing a plurality of stimulable phosphor sheets therein, on a platen, scanning a stimulating ray beam one-dimensionally in a main scanning direction on the stimulable phosphor sheet on the platen and, at the same time, carrying out scanning of the stimulating ray beam in a sub-scanning direction by moving the platen approximately normal to the main scanning direction, and photoelectrically detecting light emitted by the stimulable phosphor sheet when it is exposed to the stimulating ray beam, thereby to read out a radiation image stored on the stimulable phosphor sheet,
wherein the improvement comprises the provision of:
(i) a sheet conveyance system provided so that one end portion and the other end portion thereof are respectively close to said platen at a first stop position where said movement is started and said platen at a second stop position where said movement is finished, said sheet conveyance system conveying the stimulable phosphor sheet approximately parallel with a direction of said movement of said platen between said one end portion and said other end portion,
(ii) said magazine housing said stimulable phosphor sheets and provided close to said sheet conveyance system,
(iii) a first sheet transfer means for transferring the stimulable phosphor sheet between said magazine and said sheet conveyance system,
(iv) a second sheet transfer means for transferring the stimulable phosphor sheet from said sheet conveyance system to said platen at said first stop position,
(v) a third sheet transfer means for transferring the stimulable phosphor sheet from said platen at said second stop position to said sheet conveyance system, and
(vi) a magazine movement means for moving said magazine along a row of the stimulable phosphor sheets until a sheet outlet/inlet part of said magazine is located a predetermined position.

8. A radiation image read-out apparatus for reading out a radiation image stored on a stimulable phosphor sheet by scanning the stimulable phosphor sheet carrying the radiation image stored thereon with stimulating rays which cause the stimulable phosphor sheet to emit light in proportion to the stored radiation energy, and photoelectrically detecting the light emitted by the stimulable phosphor sheet when it is exposed to the stimulating rays,
wherein the improvement comprises the provision of:
(i) a platen for holding said stimulable phosphor sheet thereon in a cylindrical surface form,
(ii) a means for scanning said stimulating rays in a main scanning direction on said stimulable phosphor sheet by rotating a stimulating ray irradiation system around a center axis of said cylindrical surface,
(iii) a means for scanning said stimulating rays in a sub-scanning direction by moving said platen with respect to said stimulating ray irradiation system in parallel with said center axis, and
(iv) a sheet conveyance system for conveying the stimulable phosphor sheet fed to said platen or the stimulable phosphor sheet taken out of said platen by bending the stimulable phosphor sheet reversely to a direction of bending on said platen.

9. An electron microscope image read-out apparatus for exposing a two-dimensional sensor, which carries an electron microscope image of a sample stored thereon by exposure to an electron beam passing through the sample in an electron microscope, to light or heating the two-dimensional sensor to release the stored electron beam energy as light emission, converging the emitted light by a lens, and photoelectrically detecting the emitted light by a photodetector through a small aperture of an aperture plate provided at a position of the convergence, thereby to obtain image signals representing the electron microscope image,
wherein the improvement comprises the provision of:
(i) said aperture plate constituted so that the size of said aperture is variable,
(ii) an aperture changing means for changing the size of said aperture, and
(iii) a control means for receiving information on a magnification and/or an electron microscope image recording sensitivity from said electron microscope, and controlling said aperture changing means on the basis of said information so that the size of said aperture is increased as said magnification is higher and/or as said sensitivity is lower.

* * * * *